US012732520B2

(12) United States Patent
Chida

(10) Patent No.: US 12,732,520 B2
(45) Date of Patent: Sep. 8, 2026

(54) GENERATION DEVICE, GENERATION METHOD, AND GENERATION PROGRAM

(71) Applicant: NTT, Inc., Tokyo (JP)

(72) Inventor: Nariyoshi Chida, Musashino (JP)

(73) Assignee: NTT, Inc., Tokyo (JP)

( * ) Notice: Subject to any disclaimer, the term of this patent is extended or adjusted under 35 U.S.C. 154(b) by 0 days.

(21) Appl. No.: 18/839,744

(22) PCT Filed: Feb. 22, 2022

(86) PCT No.: PCT/JP2022/007419

§ 371 (c)(1), (2) Date: Aug. 20, 2024

(87) PCT Pub. No.: WO2023/162047

PCT Pub. Date: Aug. 31, 2023

(65) Prior Publication Data

US 2025/0175481 A1 May 29, 2025

(51) Int. Cl.
*H04L 9/40* (2022.01)

(52) U.S. Cl.
CPC ................................ *H04L 63/1425* (2013.01)

(58) Field of Classification Search
CPC .. H04L 63/1425; H04L 63/1416; G06F 21/55
USPC ........................................................... 726/23
See application file for complete search history.

(56) References Cited

U.S. PATENT DOCUMENTS

| | | | | |
|---|---|---|---|---|
| 9,398,028 | B1 * | 7/2016 | Karandikar | G06F 9/45558 |
| 10,243,982 | B2 * | 3/2019 | Zhong | G06F 21/552 |
| 10,721,244 | B2 * | 7/2020 | Chiba | G06F 21/55 |
| 11,677,760 | B2 * | 6/2023 | Shahbaz | H04L 63/145 726/23 |
| 2007/0112512 | A1 * | 5/2007 | McConnell | G09B 29/106 701/469 |
| 2008/0034427 | A1 * | 2/2008 | Cadambi | H04L 63/1425 726/22 |
| 2012/0331554 | A1 * | 12/2012 | Goyal | H04L 69/22 726/23 |
| 2017/0054742 | A1 * | 2/2017 | Matsumoto | H04L 63/1416 |
| 2018/0091528 | A1 * | 3/2018 | Shahbaz | G06F 21/554 |
| 2020/0342095 | A1 * | 10/2020 | Ijiro | G06F 21/55 |
| 2021/0021614 | A1 * | 1/2021 | Shahbaz | H04L 63/1475 |
| 2025/0227117 | A1 * | 7/2025 | Shahbaz | H04L 63/1458 |

OTHER PUBLICATIONS

Christian Kreibich, "Honeycomb—Creating Intrusion Detection Signatures Using Honeypots" ACM SIGCOMM Computer Communications Review, Jan. 2004.*
Md Nahid Hossain, "Sleuth: Real-time Attack Scenario Reconstruction from COTS Audit Data" 2017.*

(Continued)

*Primary Examiner* — Samson B Lemma
(74) *Attorney, Agent, or Firm* — XSENSUS LLP

(57) ABSTRACT

A generation device includes processing circuitry configured to extract log information in which a trace of intrusion remains from the log information construct graph structure data indicating an attack behavior order using time-series information included in the log information and generate a signature indicating a trace of an attack based on graph structure data constructed.

17 Claims, 51 Drawing Sheets

(56) References Cited

OTHER PUBLICATIONS

Xueyuan Han, "Provenance-based Intrusion Detection: Opportunities and Challenges" 2018.*
Kurogome et al., "Eiger: Automated IOC Generation for Accurate and Interpretable Endpoint Malware Detection", ACSAC 2019, Dec. 9-13, 2019, pp. 687-701.
Liao et al., "Acing the IOC Game: Toward Automatic Discovery and Analysis of Open-Source Cyber Threat Intelligence", CCS 2016, Oct. 24-28, 2016, pp. 755-766.
Husari et al., "TTPDrill: Automatic and Accurate Extraction of Threat Actions from Unstructured Text of CTI Sources", ACSAC 2017, pp. 103-115.
Satvat et al., "Extractor: Extracting Attack Behavior from Threat Reports", arXiv:2104.08618v1 [cs.CR], Apr. 17, 2021, 18 pages.
Gao et al., "Enabling Efficient Cyber Threat Hunting With Cyber Threat Intelligence", arXiv:2010.13637v2 [cs.CR], Feb. 25, 2021, 12 pages.

* cited by examiner

Fig. 3

```
<Event>
  <EventData><Data Name="ProcessId">0xacc</Data></EventData>
  <EventData><Data Name="ProcessId">0xa1c</Data></EventData>
  <EventData><Data Name="ProcessName">run.exe</Data></EventData>
  <EventData><Data Name="ProcessName">mal.exe</Data></EventData>
  <EventData><Data Name="FileName">abc.doc</Data></EventData>
  <EventData><Data Name="ProcessId">0x123</Data></EventData>
  <EventData><Data Name="ProcessName">notepad.exe</Data></EventData>
  <EventData><Data Name="ProcessName">mal.exe</Data></EventData>
  <EventData><Data Name="ProcessName">cmd.exe</Data></EventData>
  <EventData><Data Name="FileName">def.doc</Data></EventData>
  <EventData><Data Name="ProcessName">mal.exe</Data></EventData>
  <EventData><Data Name="ProcessName">chrome.exe</Data></EventData>
  <EventData><Data Name="ProcessId">0xc1c</Data></EventData>
  <EventData><Data Name="FileName">abc.doc</Data></EventData>
</Event>/
```

AUDIT LOG (SIMPLIFIED Event Log)

abc.doc mal.exe def.doc

TRACE
(ROW AND SECTION SEPARATING)

(a REPRESENTS LABEL.
TRACE CORRESPONDS TO LABEL.)

Fig. 30

```
rule Signature { return e; }
```

NOTATION OF ELL SIGNATURE

Fig. 31

ELL SIGNATURE

```
rule MalSig {
  return (~> [ProcessId=0x123] ~ [FileName=mal.doc])*~>[IPAddress=192.0.2.4]?;
}
```

Fig. 32

AUDIT LOG (SIMPLIFIED Event Log)

<Event>
<EventData><Data Name="ProcessId">0xacc</Data></EventData>
<EventData><Data Name="ProcessId">0x123</Data></EventData>
<EventData><Data Name="FileName">mal.doc</Data></EventData>
<EventData><Data Name="ProcessId">0x123</Data></EventData>
<EventData><Data Name="FileName">mal.doc</Data></EventData>
<EventData><Data Name="IPAddress">192.0.2.7</Data></EventData>
</Event>

Fig. 33

THIS ELL SIGNATURE CAN BE READ AS FOLLOWS:
NAME OF SIGNATURE IS MalSig, AND AS TRACE OF IoA LEVEL, AFTER PATTERN IN WHICH AUDIT LOG IN WHICH FileName INCLUDES mal.doc COMES AFTER AUDIT LOG IN WHICH ProcessId INCLUDES 0x123 IS REPEATED 0 TIMES OR MORE, AUDIT LOG IN WHICH IPAddress INCLUDES 192.0.2.4 MAY OR MAY NOT APPEAR

ELL SIGNATURE

```
rule MalSig {
  return (→ [ProcessId=0x123] → [FileName=mal.doc])*→[IPAddress=192.0.2.4]?;
}
```

AUDIT LOG (SIMPLIFIED Event Log)

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

Fig. 34

ELL SIGNATURE

```
rule MalSig {
  return (→ [ProcessId=0x123] → [FileName=mal.doc])*→[IPAddress=192.0.2.4]?;
}
```

AUDIT LOG (Event Log)

```
<Event>
 <EventData><Data Name="ProcessId">0xacc</Data></EventData>
 <EventData><Data Name="ProcessId">0x123</Data></EventData>
 <EventData><Data Name="FileName">mal.doc</Data></EventData>
 <EventData><Data Name="ProcessId">0x123</Data></EventData>
 <EventData><Data Name="FileName">mal.doc</Data></EventData>
 <EventData><Data Name="IPAddress">192.0.2.7</Data></EventData>
</Event>
```

INFORMATION IN WHICH SIMPLIFIED Windows Event Log IS DEFINED IN XML, THERE ARE SEVERAL EventData TAGS IN Event TAG, AND EventData TAG IS RECORDED BY ONE ACTION. HEREINAFTER, INFORMATION SURROUNDED BY EventData TAG IS REFERRED TO AS LOG. FOR EXAMPLE, <EventData><Data Name="ProcessId">0xacc</Data></EventData> IS LOG THAT RECORDS THAT 0xacc HAS APPEARED AS PROCESS ID.

Fig. 35

FIRST, → [ProcessId=0x123] IS EVALUATED.
THIS MEANS THAT LOG IS SKIPPED UP TO LOG IN WHICH INFORMATION THAT ProcessId IS 0x123 IS RECORDED.

ELL SIGNATURE

```
rule MalSig {
  return (→ [ProcessId=0x123]→ [FileName=mal.doc])*→[IPAddress=192.0.2.4]?;
}
```

Fig. 36

FIRST, → [ProcessId=0x123] IS EVALUATED.
THIS MEANS THAT LOG IS SKIPPED UP TO LOG IN WHICH INFORMATION THAT ProcessId IS 0x123 IS RECORDED.

ELL SIGNATURE

```
rule MalSig {
  return (→ [ProcessId=0x123] → [FileName=mal.doc])*→[IPAddress=192.0.2.4]?;
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

SINCE ProcessId OF FIRST LOG IS NOT 0x123, FIRST LOG IS SKIPPED

Fig. 37

FIRST, → [ProcessId=0x123] IS EVALUATED.
THIS MEANS THAT LOG IS SKIPPED UP TO LOG IN WHICH INFORMATION THAT ProcessId IS 0x123 IS RECORDED.

ELL SIGNATURE

```
rule MalSig {
  return (→ [ProcessId=0x123] → [FileName=mal.doc])*→[IPAddress=192.0.2.4]?;
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

CORRESPONDING LOG CAN BE FOUND, AND THUS, LOG IS MOVED TO NEXT LOG

Fig. 38

NEXT, → [FileName=mal.doc] IS EVALUATED.
THIS MEANS SKIPPING LOG UP TO LOG RECORDING INFORMATION
THAT FileName IS mal.doc.

ELL SIGNATURE

```
rule MalSig {
  return (→ [ProcessId=0x123] → [FileName=mal.doc])*→[IPAddress=192.0.2.4]?;
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

SINCE LOG BEING VIEWED IS LOG IN WHICH mal.doc IS ALREADY RECORDED, LOG IS MOVED TO NEXT LOG WITHOUT SKIPPING

Fig. 39

NEXT, → [FileName=mal.doc] IS EVALUATED.
THIS MEANS SKIPPING LOG UNTIL RECORDING INFORMATION
THAT FileName IS mal.doc.

ELL SIGNATURE

```
rule MalSig {
  return (→ [ProcessId=0x123] → [FileName=mal.doc])*→[IPAddress=192.0.2.4]?;
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

SINCE LOG BEING VIEWED IS LOG IN WHICH mal.doc IS ALREADY RECORDED, LOG IS MOVED TO NEXT LOG WITHOUT SKIPPING

Fig. 40

NEXT, (→[ProcessId=0x123]→[FileName=mal.doc])* IS EVALUATED. SINCE PATTERN SURROUNDED BY * IS MATCHED WITH LOG BEING VIEWED FIRST, PATTERN SURROUNDED BY * IS CHECKED AGAIN HERE.

ELL SIGNATURE

```
rule MalSig {
  return (→ [ProcessId=0x123] → [FileName=mal.doc])*→[IPAddress=192.0.2.4]?;
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

Fig. 41

→[ProcessId=0x123] IS EVALUATED AGAIN.
SAME PROCESSING AS FIRST PROCESSING IS PERFORMED.

ELL SIGNATURE

```
rule MalSig {
  return (→ [ProcessId=0x123] → [FileName=mal.doc])*→[IPAddress=192.0.2.4]?;
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

SINCE LOG BEING VIEWED IS ALREADY RECORDING 0x123, THERE IS NO SKIP AND LOG IS MOVED TO NEXT LOG

Fig. 42

→[FileName=mal.doc] IS EVALUATED AGAIN.
SAME PROCESSING AS FIRST PROCESSING IS PERFORMED.

ELL SIGNATURE

```
rule MalSig {
  return (→ [ProcessId=0x123] → [FileName=mal.doc])*→[IPAddress=192.0.2.4]?;
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

SINCE LOG BEING VIEWED IS ALREADY RECORDING mal.doc, THERE IS NO SKIP AND LOG IS MOVED TO NEXT LOG

Fig. 43

NEXT, (→[ProcessId=0x123]→[FileName=mal.doc])* IS EVALUATED. PATTERN ALREADY SURROUNDED BY * DOES NOT MATCH AFTER LOG BEING VIEWED, AND THUS IS NOT REPEATEDLY PERFORMED.

ELL SIGNATURE

```
rule MalSig {
  return (→[ProcessId=0x123]→[FileName=mal.doc])*→[IPAddress=192.0.2.4]?;
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

Fig. 44

NEXT, → [IPAddress=192.0.2.4]? IS EVALUATED.
ALTHOUGH IPAddress IS RECORDED IN LOG BEING VIEWED, VALUE OF LOG IS DIFFERENT FROM 192.0.2.7 AND DOES NOT MATCH [IPAddress=192.0.2.4]. HOWEVER, SINCE [IPAddress=192.0.2.4] IS SURROUNDED BY ?, IT DOES NOT NEED TO MATCH [IPAddress=192.0.2.4].

ELL SIGNATURE

```
rule MalSig {
  return (→ [ProcessId=0x123] → [FileName=mal.doc])*→[IPAddress=192.0.2.4]?;
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

Fig. 45

EVALUATION OF ELL SIGNATURE IS COMPLETED.
SINCE MATCHING HAS NOT FAILED, IT CAN BE SEEN THAT
ACTION DEFINED BY SIGNATURE EXISTS IN AUDIT LOG.

ELL SIGNATURE

```
rule MalSig {
  return (→ [ProcessId=0x123] → [FileName=mal.doc])*→[IPAddress=192.0.2.4]?;
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

Fig. 46

NEXT, CASE WHERE THERE IS NO ACTION DEFINED BY ELL SIGNATURE IN AUDIT LOG WILL BE INTRODUCED.
THIS ELL SIGNATURE CAN BE READ AS FOLLOWS:
SOMEWHERE IN AUDIT LOG,
THERE IS LOG RECORDING INFORMATION IN WHICH ProcessId IS 0x111,
OR THERE IS LOG RECORDING INFORMATION IN WHICH FileName IS failure.pptx.

ELL SIGNATURE

```
rule MalSig {
  return → ([ProcessId=0x111]|[FileName=failure.pptx]);
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

Fig. 47

EVALUATION IS ALSO CHECKED.
FIRST, →([ProcessId=0x111]|[FileName=failure.pptx]) IS EVALUATED.

ELL SIGNATURE

```
rule MalSig {
  return ~ ([ProcessId=0x111]|[FileName=failure.pptx]);
}
```

AUDIT LOG

```
<Event>
 <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

Fig. 49

EVALUATION IS ALSO CHECKED.
FIRST, →([ProcessId=0x111][FileName=failure.pptx]) IS EVALUATED.
HOWEVER, SINCE THIS MATCH FAILS, THIS MATCH OF ELL SIGNATURE ITSELF ALSO FAILS. THEREFORE, IT CAN BE SEEN THAT THERE IS NO BEHAVIOR DEFINED BY THIS ELL SIGNATURE IN THIS AUDIT LOG.

ELL SIGNATURE

```
rule MalSig {
  return → ([ProcessId=0x111][FileName=failure.pptx]);
}
```

AUDIT LOG

```
<Event>
  <EventData><Data Name="ProcessId">0xacc</Data></EventData>
  <EventData><Data Name="ProcessId">0x123</Data></EventData>
  <EventData><Data Name="FileName">mal.doc</Data></EventData>
  <EventData><Data Name="ProcessId">0x123</Data></EventData>
  <EventData><Data Name="FileName">mal.doc</Data></EventData>
  <EventData><Data Name="IPAddress">192.0.2.7</Data></EventData>
</Event>
```

ALL LOGS HAVE BEEN CHECKED, BUT THERE IS NO LOG HAVING ProcessId OF 0x111, AND THUS ALL LOGS ARE SKIPPED.

GENERATION DEVICE, GENERATION METHOD, AND GENERATION PROGRAM

CROSS-REFERENCE TO RELATED APPLICATION

The present application is a national stage application, pursuant to 35 U.S.C. § 371, of International Patent Application No. PCT/JP2022/007419, filed Feb. 22, 2022, the entire contents of which are incorporated herein by reference.

TECHNICAL FIELD

The present invention relates to a generation device, a generation method, and a generation program.

BACKGROUND ART

Conventionally, cyber-attacks remain a major threat to society. In order to counter this threat, companies are trying to detect cyberattacks early by defining a known trace of attack (IoC: Indicator of Compromise) as a signature, and comparing them with audit log recording operations on a terminal.

However, in recent years, attack technology has also developed, and it has been pointed out that advanced attacks may not be able to be detected simply with an IoC-based signature. Further, it has also been reported that the developed attack cannot be detected only by the IoC, but can be detected by regarding the IoC as an action of an association attack (IoA: Indicator of Attack), and many new signatures focusing on the IoA have been devised. While an IoA-based signature has sufficient expressiveness to detect developed attacks, writing a signature requires acquiring complex syntax, and the signature is less easy to use as compared with an IoC-based signature.

Examples of the IoC-based signature automatic generation technology include EIGER and iACE (see, for example, Non Patent Literature 1 and Non Patent Literature 2). Further, as a technique for extracting the IoA information, for example, there are TPDrill and EXTRACTOR (see, for example, Non Patent Literature 3 and Non Patent Literature 4). In addition, examples of the IoA-based signature automatic generation technology include ThreatRaptor (see, for example, Non Patent Literature 5).

CITATION LIST

Non Patent Literature

Non Patent Literature 1: Y. Kurogome et al., "EIGER: Automated IOC Generation for Accurate and Interpretable Endpoint Malware Detection", ACSAC 2019

Non Patent Literature 2: X. Liao et al., "Acing the IOC Game: Toward Automatic Discovery and Analysis of Open-Source Cyber Threat Intelligence", CCS 2016

Non Patent Literature 3: G. Husari et al., "TTPDrill: Automatic and Accurate Extraction of Threat Actions from Unstructured Text of CTI Sources", ACSAC 2017

Non Patent Literature 4: K. Satvat et al., "EXTRACTOR: Extracting Attack Behavior from Threat Reports", EuroS&P 2021

Non Patent Literature 5: P. Gao et al., "Enabling Efficient Cyber Threat Hunting With Cyber Threat Intelligence", ICDE 2021

SUMMARY OF INVENTION

Technical Problem

However, the conventional technology has a problem that an IoA-based signature cannot be automatically generated from an IoC. For example, the automatic signature generation technology of the IoC automatically generates an IoC-based signature from a known IoC, a threat report, or the like, and is not intended to automatically generate an IoA-based signature. In addition, the IoA information extraction technology is a technology that extracts information regarding the IoA after tagging the information from a threat report or the like or extracts the information in a graph structure, and is not intended to automatically generate an IoA-based signature. In addition, the existing IoA-based automatic signature generation technology supports only a function of automatically generating a signature from a threat report, and automatic generation of a signature from trace information discovered by a user is not a target.

The present invention has been made in view of the above, and an object thereof is to provide a generation device, a generation method, and a generation program capable of automatically generating an IoA-based signature from IoC.

Solution to Problem

In order to solve the above problem and achieve the object, a generation device of the present invention includes processing circuitry configured to extract log information in which a trace of intrusion remains from the log information, construct graph structure data indicating an attack behavior order using time-series information included in the log information extracted, and generate a signature indicating a trace of an attack based on graph structure data constructed by the construction unit.

Advantageous Effects of Invention

According to the present invention, it is possible to automatically generate an IoA-based signature from IoC.

BRIEF DESCRIPTION OF DRAWINGS

FIG. 3 is a diagram illustrating details of the processing by the audit log extraction unit.

FIG. 30 is a diagram illustrating notation of an ELL signature.

FIG. 31 is a diagram illustrating an example of the ELL signature.

FIG. 32 is a diagram illustrating an example of an audit log.

FIG. 33 is a diagram illustrating a confirmation example as to whether there is a trace of an IoA level in an audit log using ELL.

FIG. 34 is a diagram illustrating the confirmation example as to whether there is the trace of the IoA level in the audit log using the ELL.

FIG. 35 is a diagram illustrating the confirmation example as to whether there is the trace of the IoA level in the audit log using the ELL.

FIG. 36 is a diagram illustrating the confirmation example as to whether there is the trace of the IoA level in the audit log using the ELL.

FIG. 37 is a diagram illustrating the confirmation example as to whether there is the trace of the IoA level in the audit log using the ELL.

FIG. 38 is a diagram illustrating the confirmation example as to whether there is the trace of the IoA level in the audit log using the ELL.

FIG. 39 is a diagram illustrating the confirmation example as to whether there is the trace of the IoA level in the audit log using the ELL.

FIG. 40 is a diagram illustrating the confirmation example as to whether there is the trace of the IoA level in the audit log using the ELL.

FIG. 41 is a diagram illustrating the confirmation example as to whether there is the trace of the IoA level in the audit log using the ELL.

FIG. 42 is a diagram illustrating the confirmation example as to whether there is the trace of the IoA level in the audit log using the ELL.

FIG. 43 is a diagram illustrating the confirmation example as to whether there is the trace of the IoA level in the audit log using the ELL.

FIG. 44 is a diagram illustrating the confirmation example as to whether there is the trace of the IoA level in the audit log using the ELL.

FIG. 45 is a diagram illustrating the confirmation example as to whether there is the trace of the IoA level in the audit log using the ELL.

FIG. 46 is a diagram illustrating the confirmation example as to whether there is the trace of the IoA level in the audit log using the ELL.

FIG. 47 is a diagram illustrating the confirmation example as to whether there is the trace of the IoA level in the audit log using the ELL.

FIG. 49 is a diagram illustrating the confirmation example as to whether there is the trace of the IoA level in the audit log using the ELL.

DESCRIPTION OF EMBODIMENTS

Hereinafter, embodiments of a generation device, a generation method, and a generation program according to the present application will be described in detail with reference to the drawings. Moreover, the present invention is not limited to the embodiment described below.

[Configuration of Generation Device]

Figure 1:
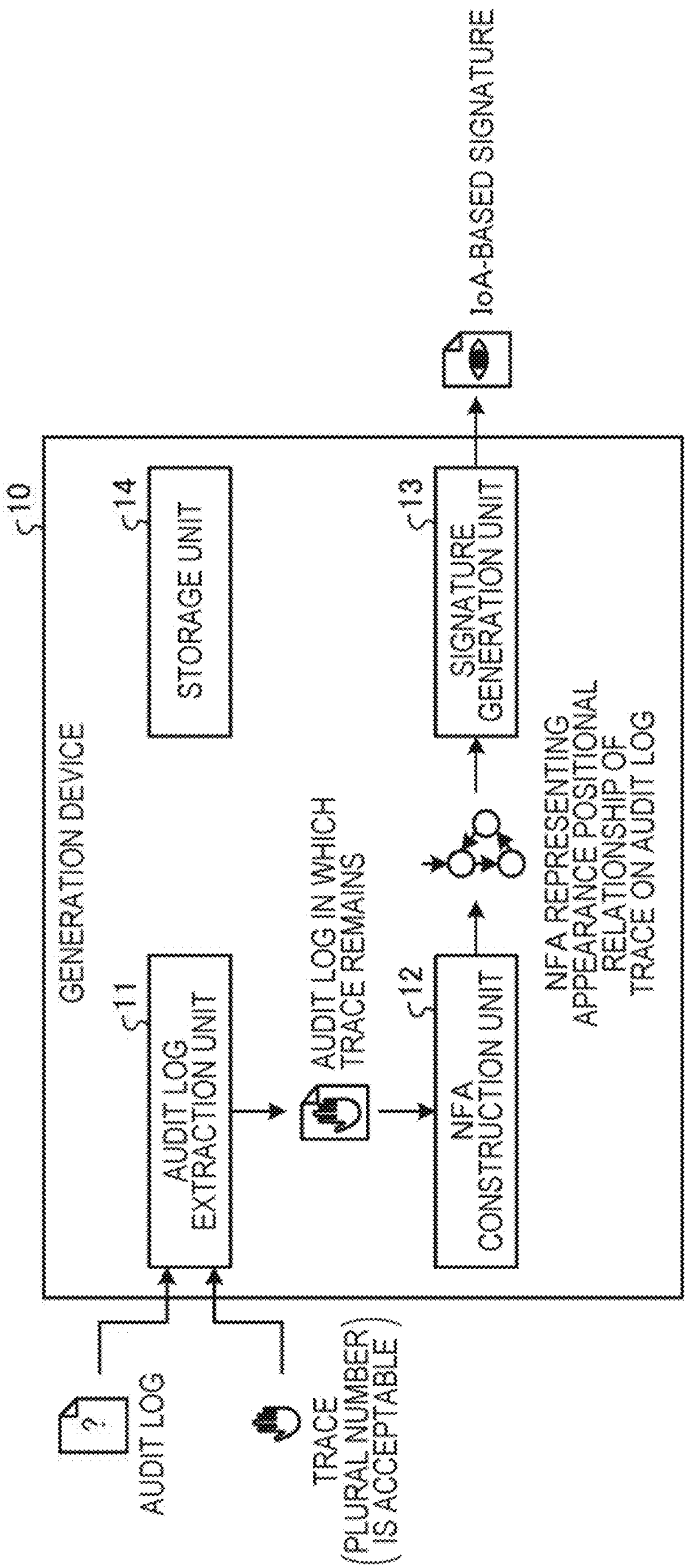
FIG. 1 is a block diagram illustrating a configuration of a generation device of a present embodiment.

FIG. 1 is a block diagram illustrating a configuration of the generation device of the present embodiment. As illustrated in FIG. 1, a generation device 10 of the present exemplary embodiment extracts an audit log in which a trace (intrusion trace (IoC)) remains from an audit log (log information). Then, the generation device 10 constructs graph structure data (NFA) indicating the attack behavior order using the time-series information included in the extracted audit log. For example, the generation device 10 constructs an NFA indicating an appearance positional relationship of a trace on the audit log. Subsequently, the generation device 10 generates an IoA-based signature (signature indicating a trace of attack) based on the constructed graph structure data.

For example, the generation device 10 can obtain the IoA-based signature for capturing the trace and the behavior of the attack indicated by the audit log without memorizing specialized knowledge or the syntax of the IoA-based signature description language only by collecting the audit log and the IoC. In addition, for example, after collating the audit log and the IoC and extracting a trace of an attack actually left in the audit log, the generation device 10 regards time-series information of the audit log as an attack behavior order, and expresses the information by a graph structure called NFA. Since it is widely known that NFA can be converted into a regular expression, an existing conversion algorithm is used to convert the NFA into a regular expression, and finally, the regular expression is rewritten into an IoA-based signature.

The generation device 10 according to the present embodiment includes an audit log extraction unit 11, an NFA construction unit 12, and a signature generation unit 13. Hereinafter, each of the units will be described.

The audit log extraction unit 11 extracts log information in which traces of intrusion remain from the audit log. For example, the audit log extraction unit 11 searches for whether there is a character string corresponding to a trace of intrusion in the event data included in the audit log, and extracts the event data including the character string corresponding to the trace of intrusion.

Figure 2:
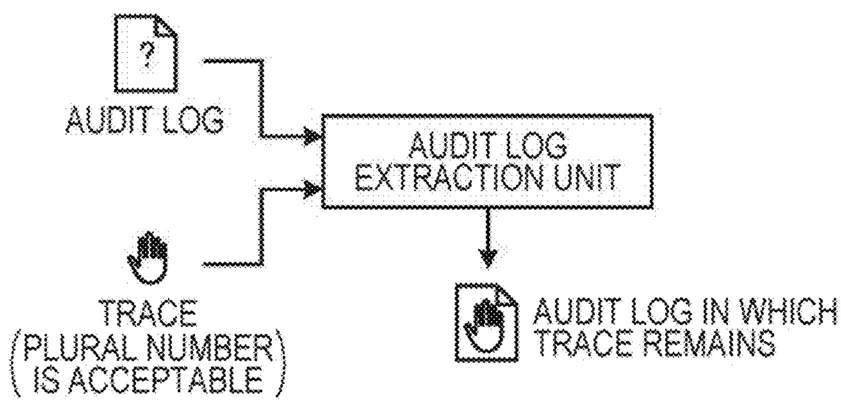
FIG. 2 is a diagram illustrating an outline of processing by an audit log extraction unit.

For example, as illustrated in FIG. 2, the audit log extraction unit 11 checks whether a trace remains in the audit log, and extracts a portion where a trace remains. FIG. 2 is a diagram illustrating an outline of processing by an audit log extraction unit.

Figure 4:
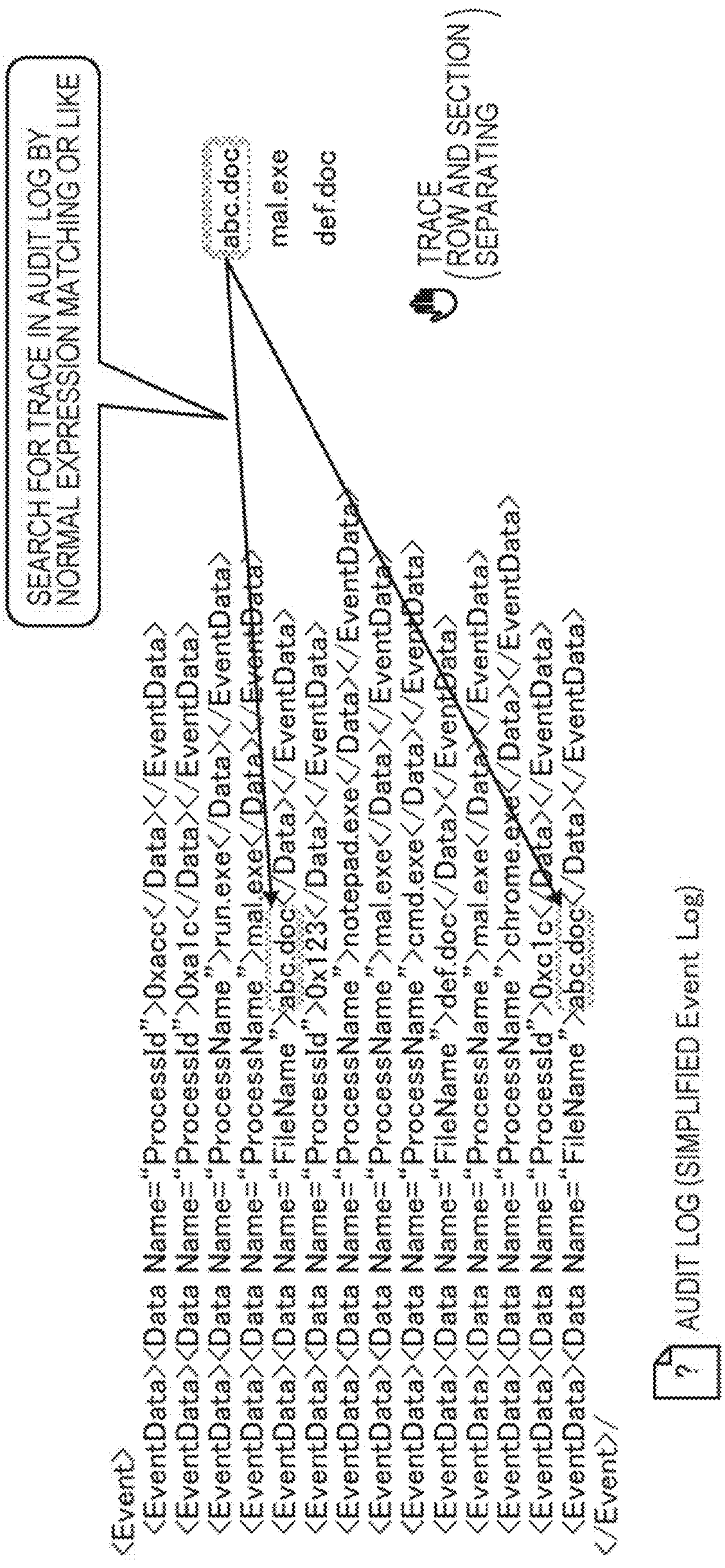
FIG. 4 is a diagram illustrating the details of the processing by the audit log extraction unit.

Next, details of processing by the audit log extraction unit will be described with reference to FIGS. 3 to 7. FIGS. 3 to 7 are diagrams illustrating the details of the processing by the audit log extraction unit. As illustrated in FIG. 3, as an individual example, a simplified Windows (registered trademark) Event Log is used as the audit log. Then, the audit log extraction unit 11 searches for traces in the audit log by a regular expression match or the like. For example, as illustrated in FIG. 4, the audit log extraction unit 11 first searches for the first trace "abc.doc".

Figure 5:
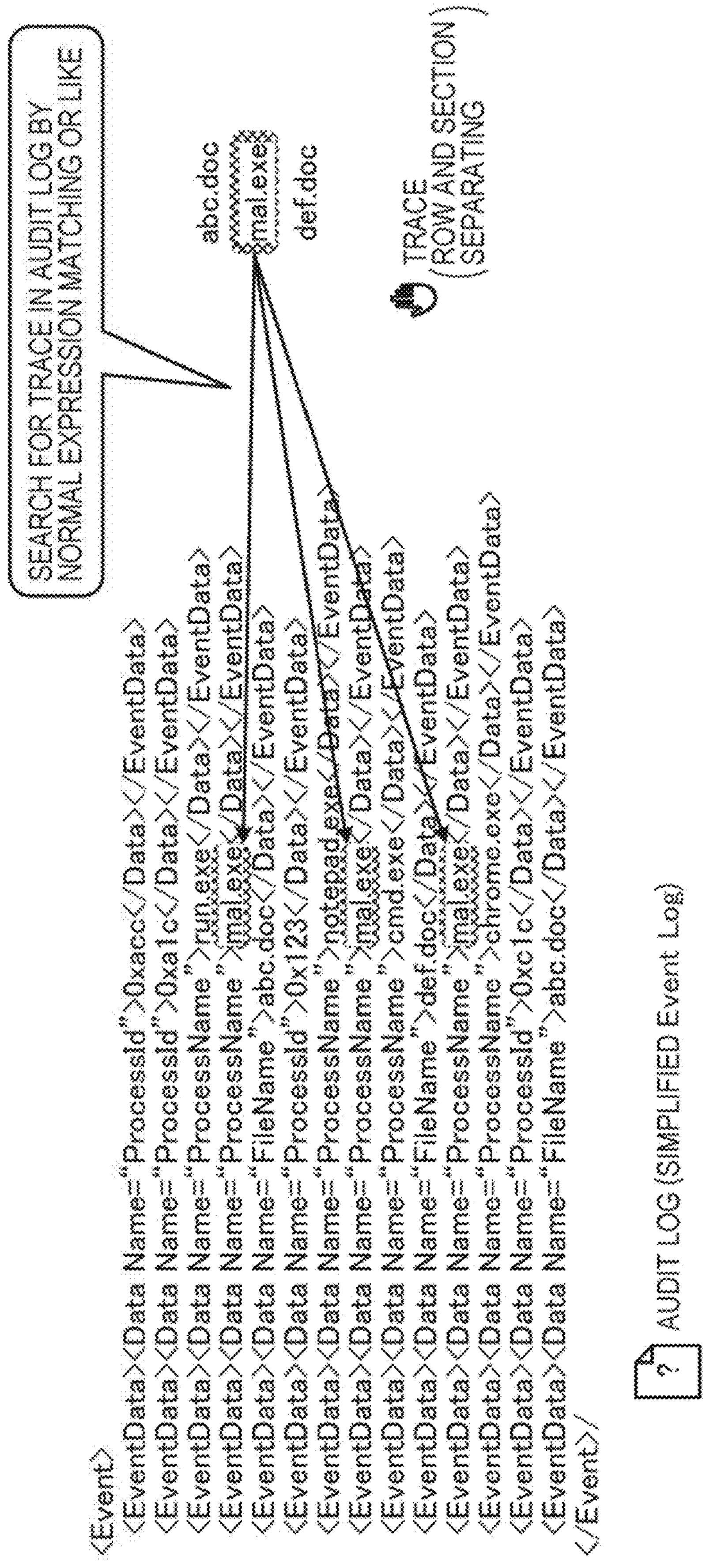
FIG. 5 is a diagram illustrating the details of the processing by the audit log extraction unit.
Figure 6:
FIG. 6 is a diagram illustrating the details of the processing by the audit log extraction unit.
Figure 7:
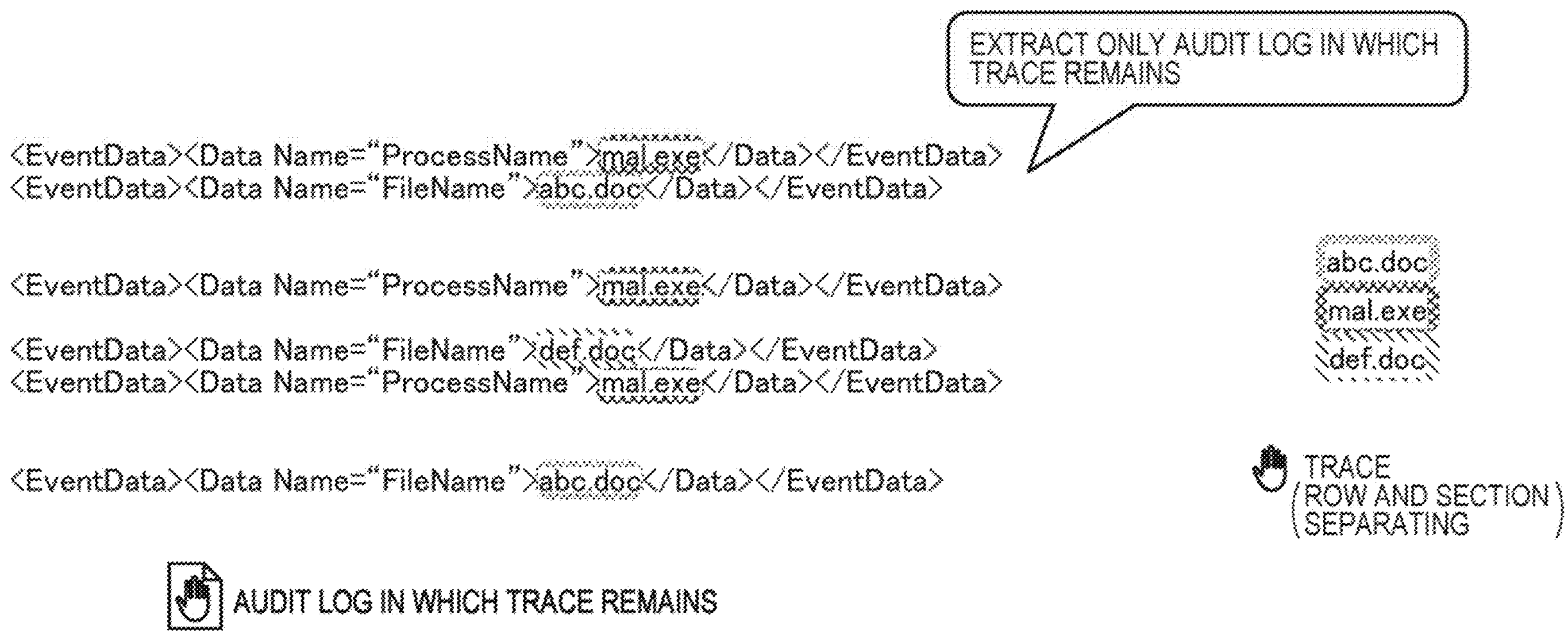
FIG. 7 is a diagram illustrating the details of the processing by the audit log extraction unit.

Then, as illustrated in FIG. 5, the audit log extraction unit 11 searches for the next trace "mal.exe". Subsequently, as illustrated in FIG. 6, the audit log extraction unit 11 performs a search for the last trace "def.doc". Then, as illustrated in FIG. 7, after searching for all traces, the audit log extraction unit 11 extracts only an audit log in which traces remain.

Figure 8:
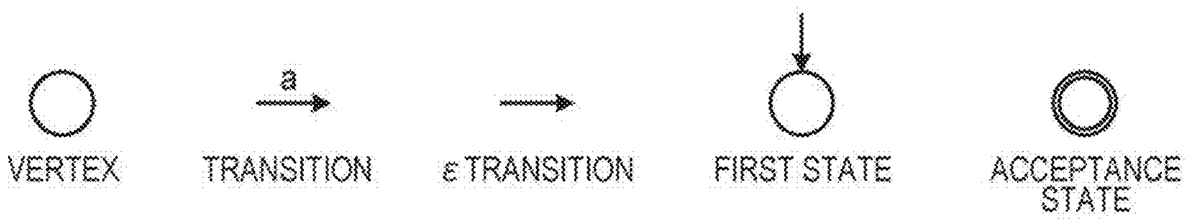
FIG. 8 is a diagram illustrating notation of nondeterministic finite automaton (NFA).

The NFA construction unit 12 constructs graph structure data indicating the attack behavior order using the time-series information included in the log information extracted by the audit log extraction unit 11. For example, the NFA construction unit 12 constructs an NFA as graph structure data. Note that, here, the definition of the NFA is minimized to general ones such as calculation theory and automaton language theory. When the NFA is represented as a diagram, the notation of FIG. 8 is used. FIG. 8 is a diagram for describing notation of the NFA.

Figure 9:
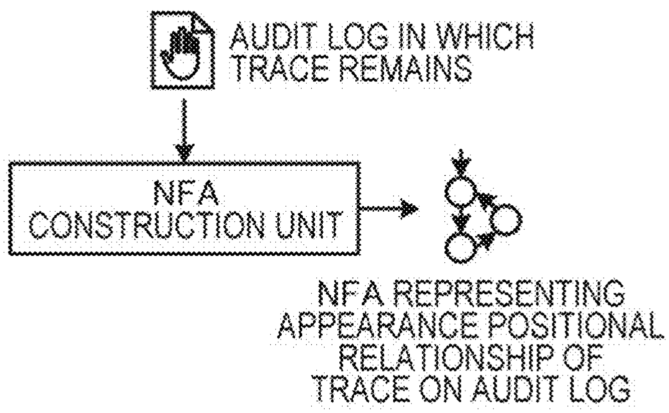
FIG. 9 is a diagram illustrating an outline of processing by an NFA construction unit.

As illustrated in FIG. 9, the NFA construction unit 12 constructs an NFA indicating an appearance positional relationship of a trace from a trace remaining audit log passed from the audit log extraction unit 11 in order to obtain an anteroposterior relationship between traces, repeated trace information, and ambiguity information from the trace remaining audit log.

Figure 10:
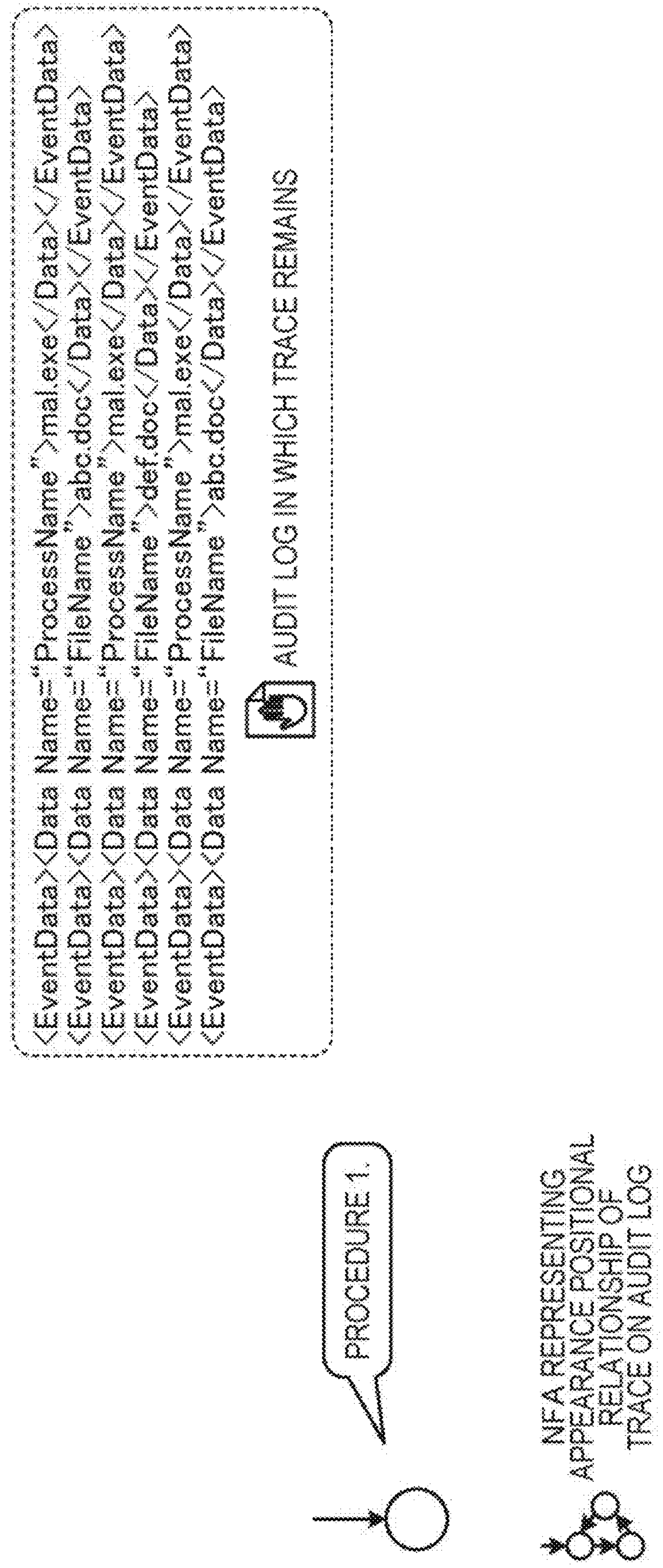
FIG. 10 is a diagram illustrating the details of processing by the NFA construction unit.
Figure 11:
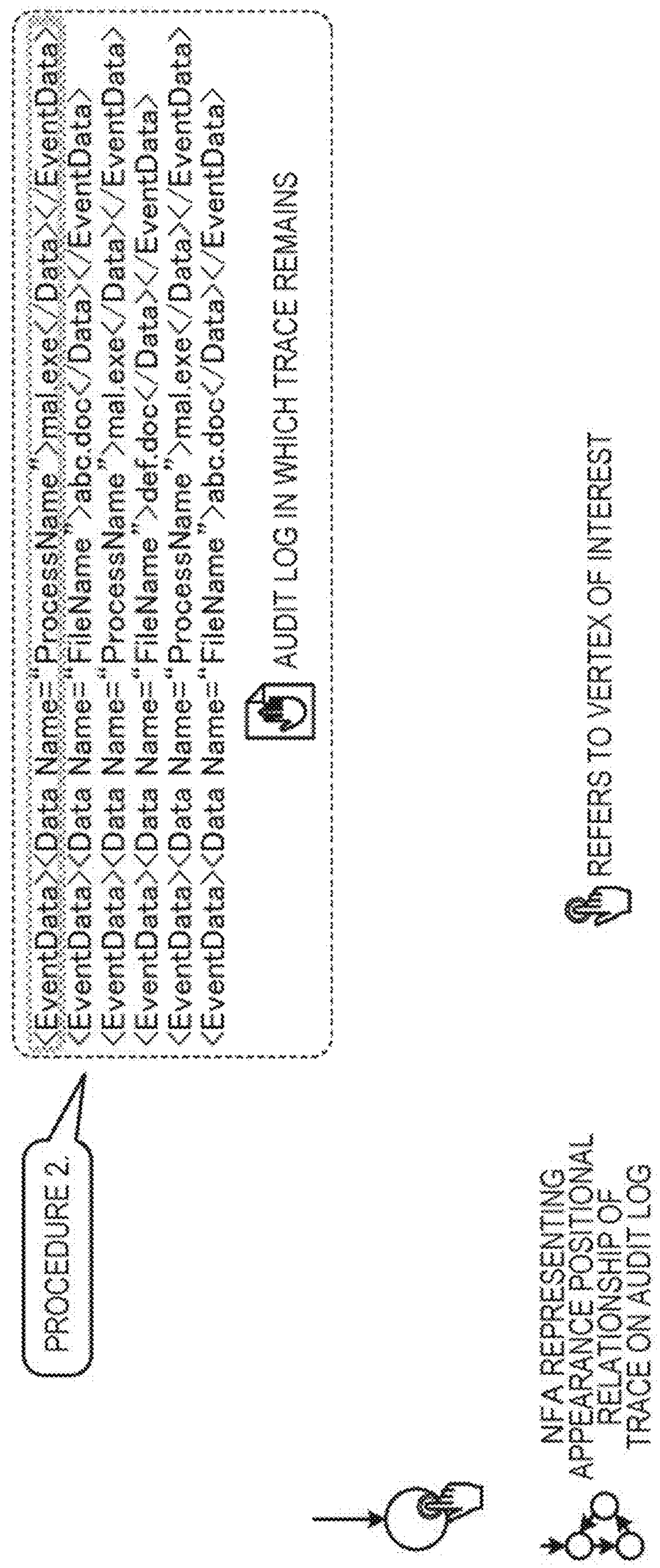
FIG. 11 is a diagram illustrating the details of processing by the NFA construction unit.
Figure 12:
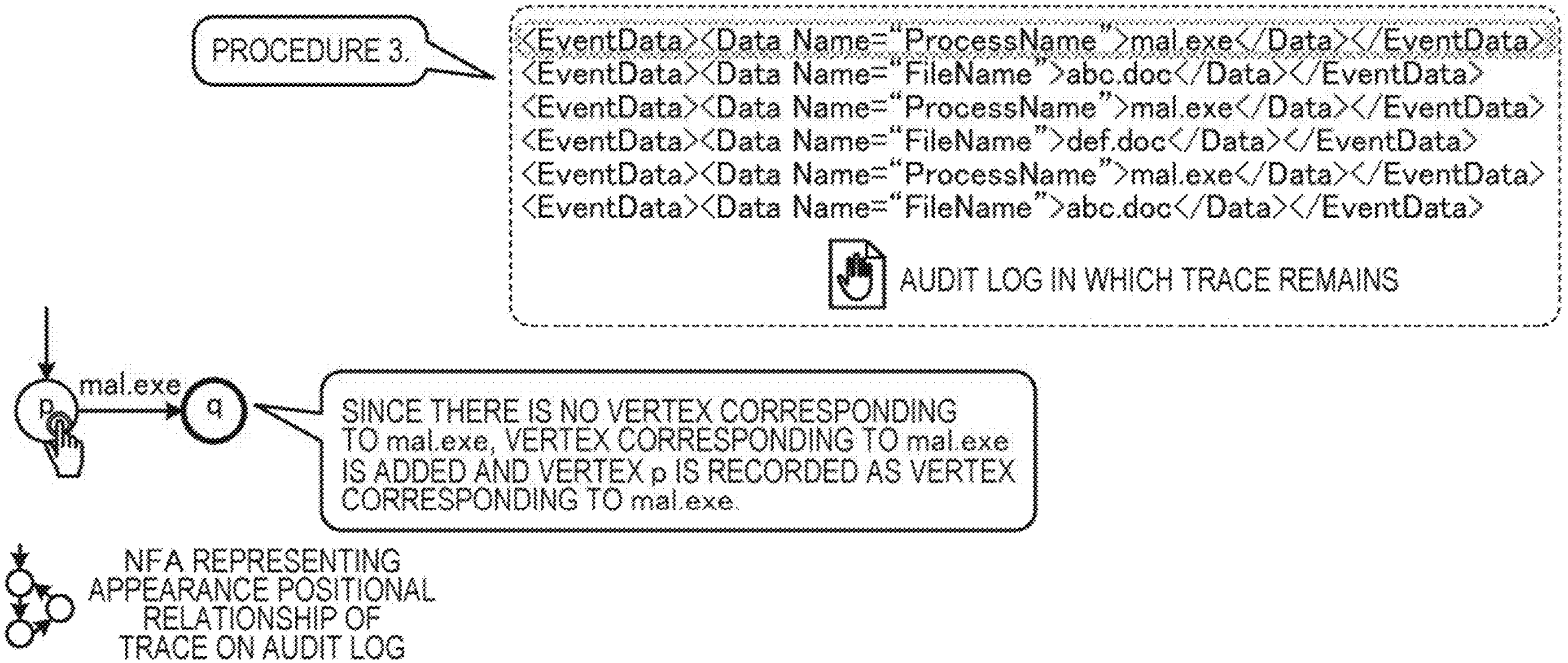
FIG. 12 is a diagram illustrating the details of processing by the NFA construction unit.

Next, details of processing by the NFA construction unit 12 will be described with reference to FIGS. 10 to 23. FIGS. 10 to 23 are diagrams illustrating the details of processing by the NFA construction unit. As illustrated in FIG. 10, the NFA construction unit 12 sets the NFA in an initial state (Procedure 1). Then, as illustrated in FIG. 11, the NFA construction unit 12 selects an audit log in which a trace of the head is left (Procedure 2). Then, as illustrated in FIG. 12, the NFA construction unit 12 performs processing of constructing the NFA (Procedure 3). In the example of FIG. 12, since there is no vertex corresponding to "mal.exe", the NFA construction unit 12 adds a vertex corresponding to "mal.exe" and records the vertex "p" as a vertex corresponding to "mal.exe".

Figure 13:
FIG. 13 is a diagram illustrating the details of processing by the NFA construction unit.
Figure 14:
FIG. 14 is a diagram illustrating the details of processing by the NFA construction unit.
Figure 15:
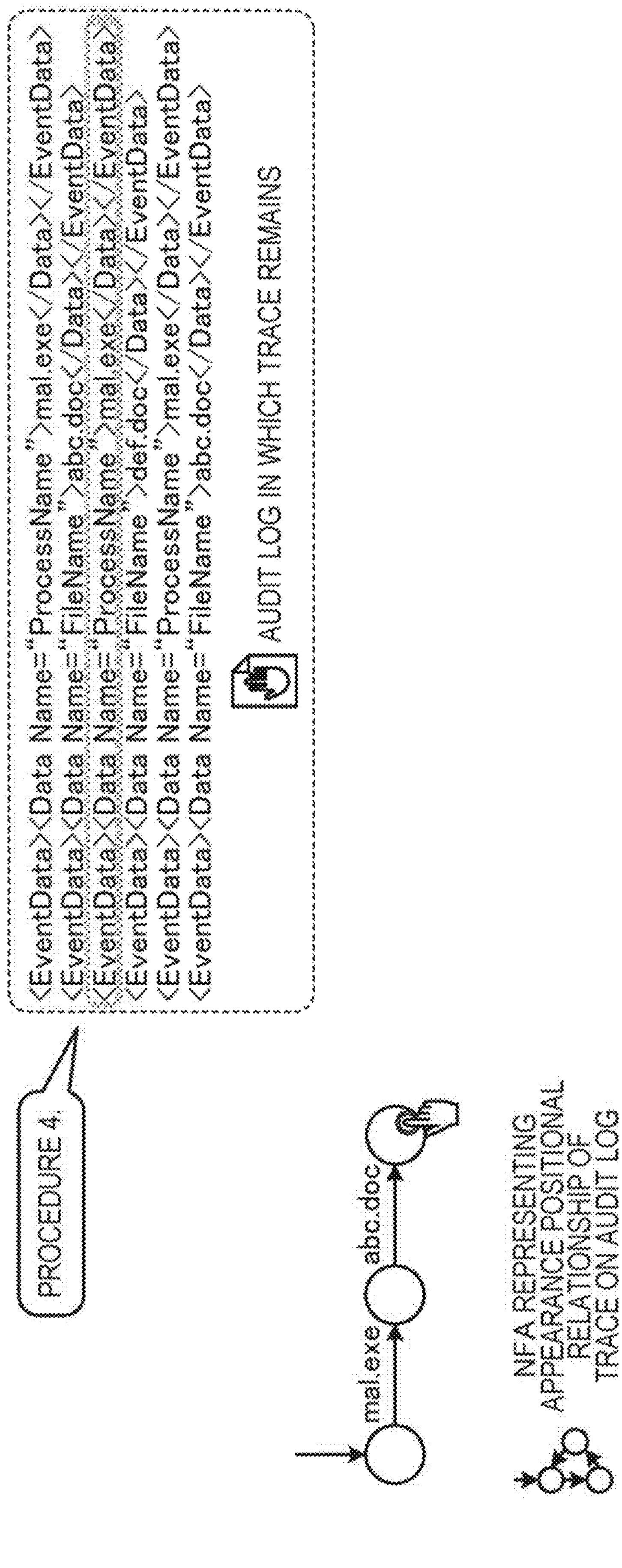
FIG. 15 is a diagram illustrating the details of processing by the NFA construction unit.
Figure 16:
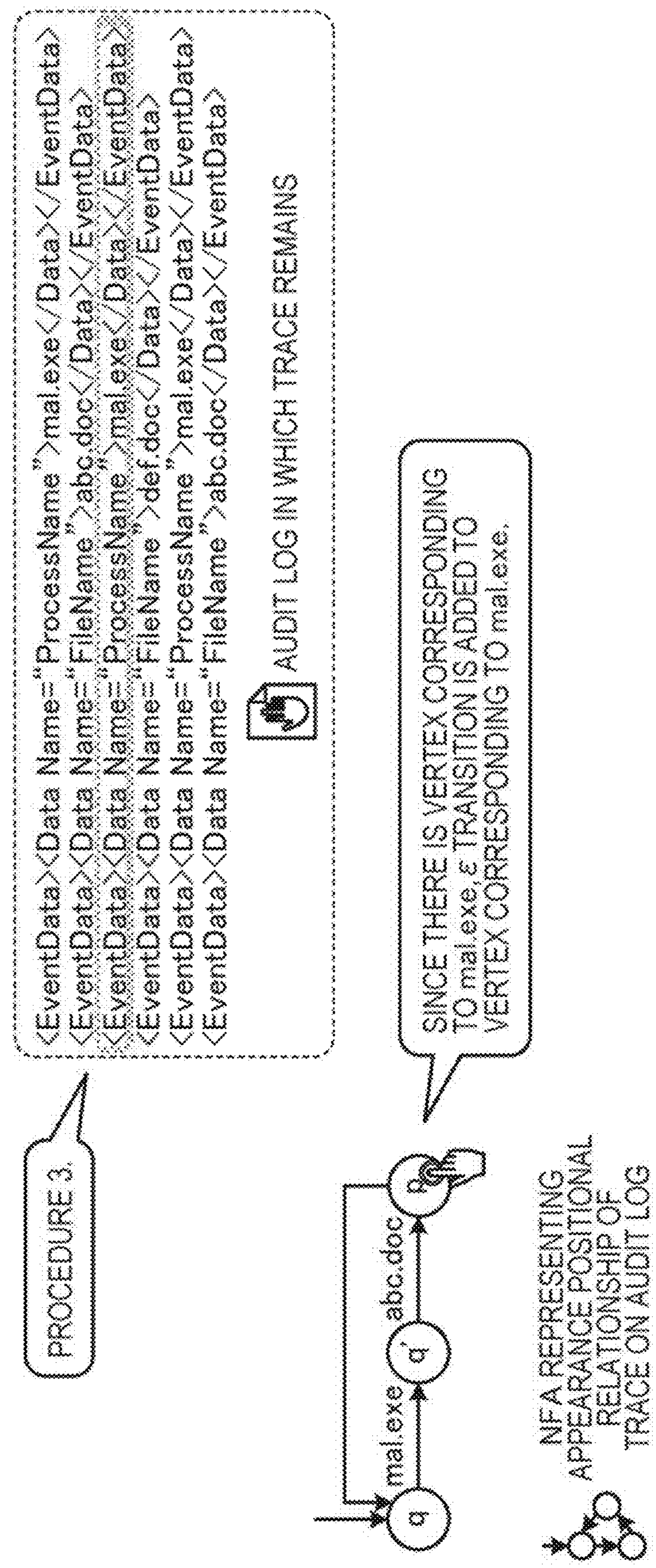
FIG. 16 is a diagram illustrating the details of processing by the NFA construction unit.

Then, as illustrated in FIG. 13, the NFA construction unit 12 selects an audit log in which the following trace remains (Procedure 4). Then, as illustrated in FIGS. 14 and 15, the NFA construction unit 12 similarly performs Procedure 3 and Procedure 4. Then, as illustrated in FIG. 16, since there is a vertex corresponding to "mal.exe", the NFA construction unit 12 adds ε transition to the vertex corresponding to "mal.exe".

Figure 17:
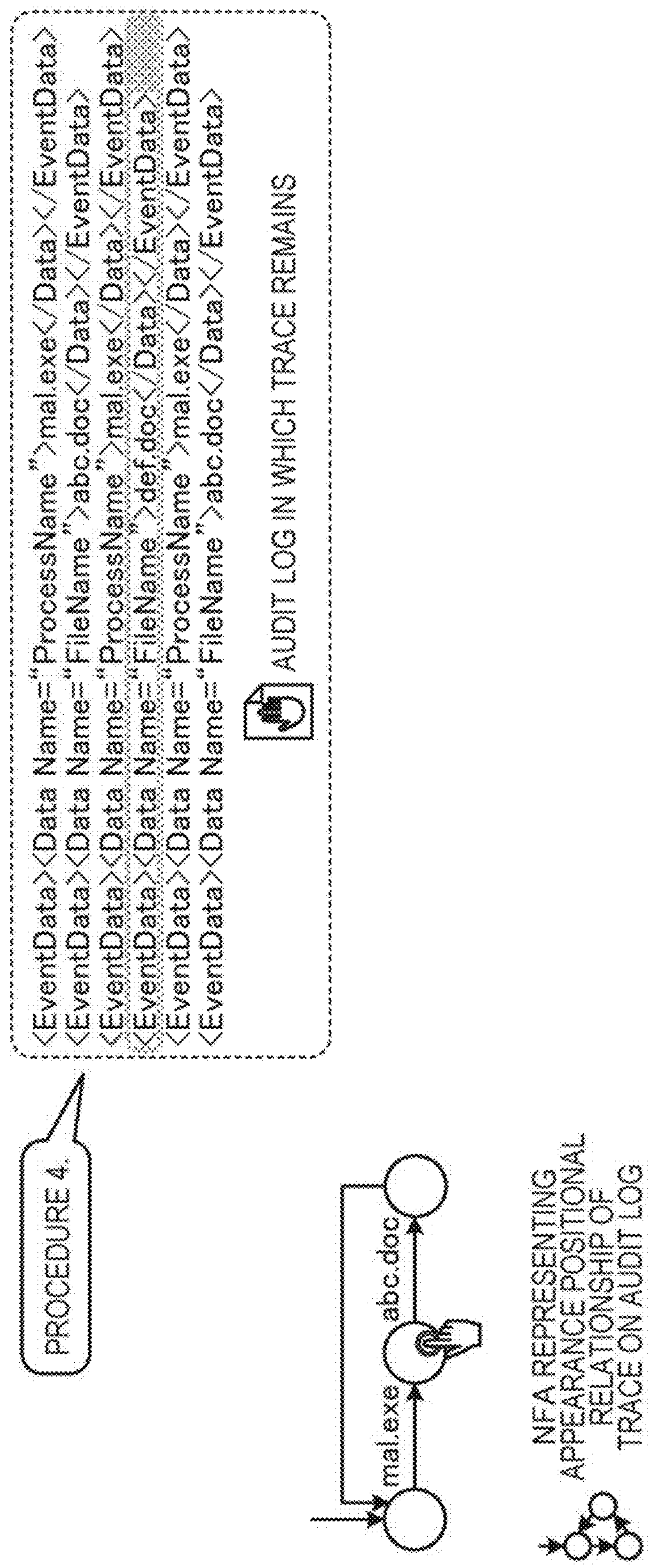
FIG. 17 is a diagram illustrating the details of processing by the NFA construction unit.
Figure 18:
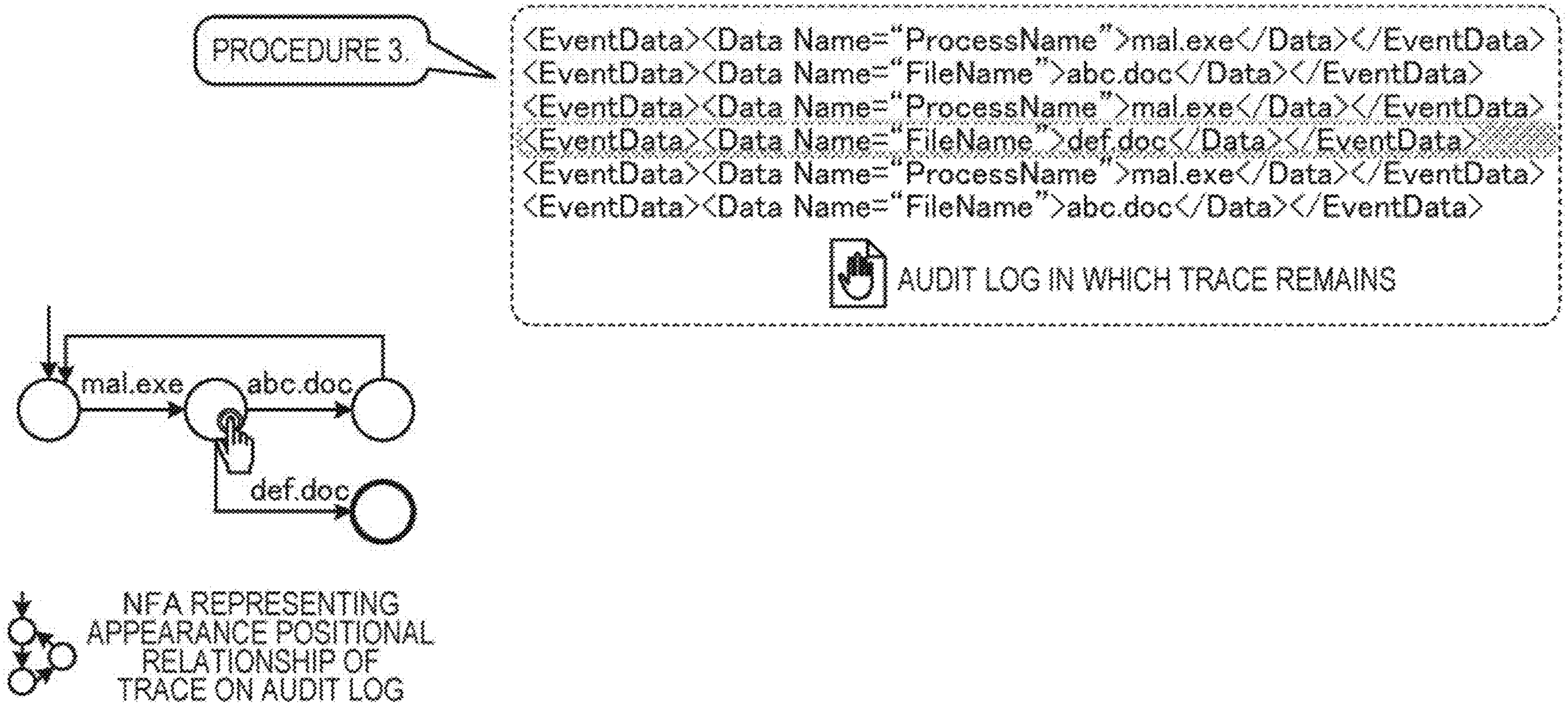
FIG. 18 is a diagram illustrating the details of processing by the NFA construction unit.
Figure 19:
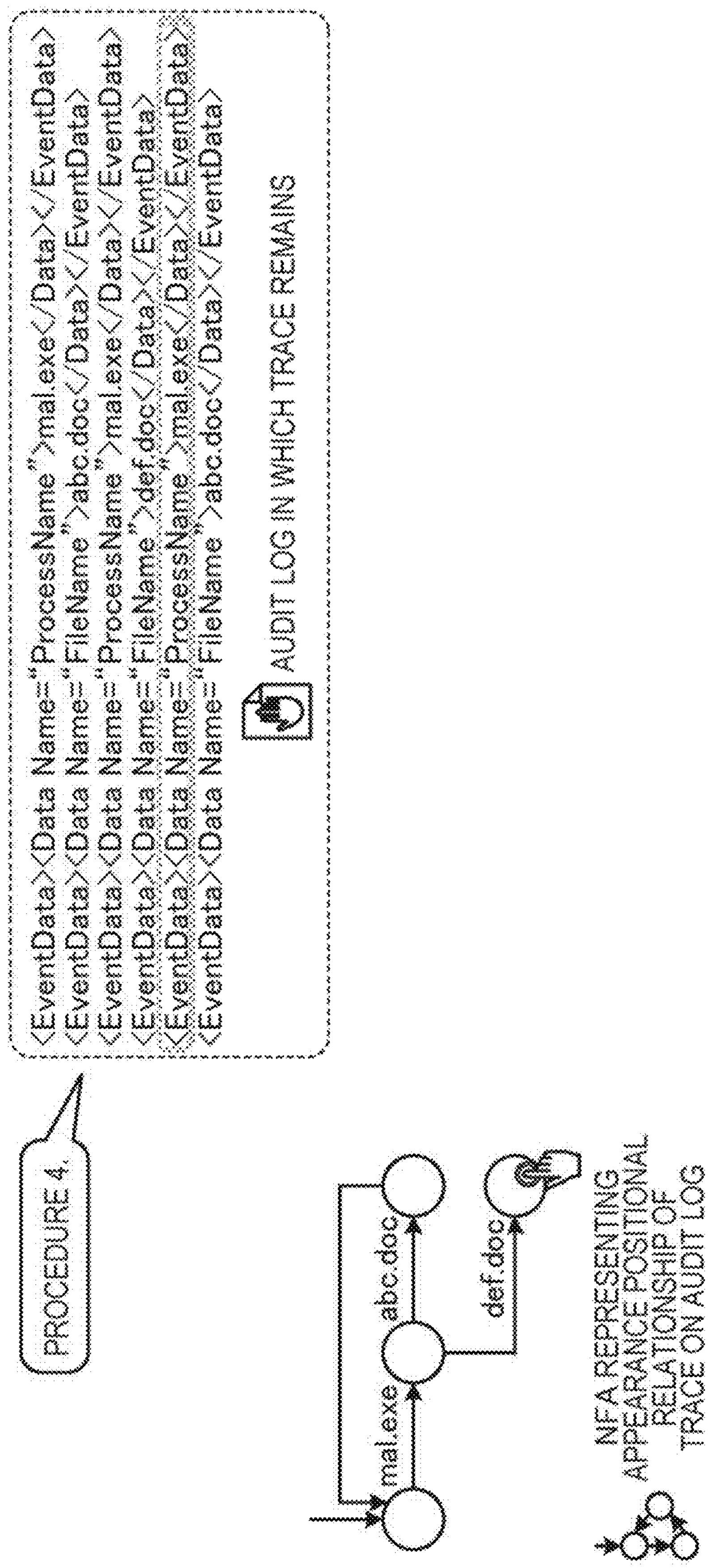
FIG. 19 is a diagram illustrating the details of processing by the NFA construction unit.
Figure 20:
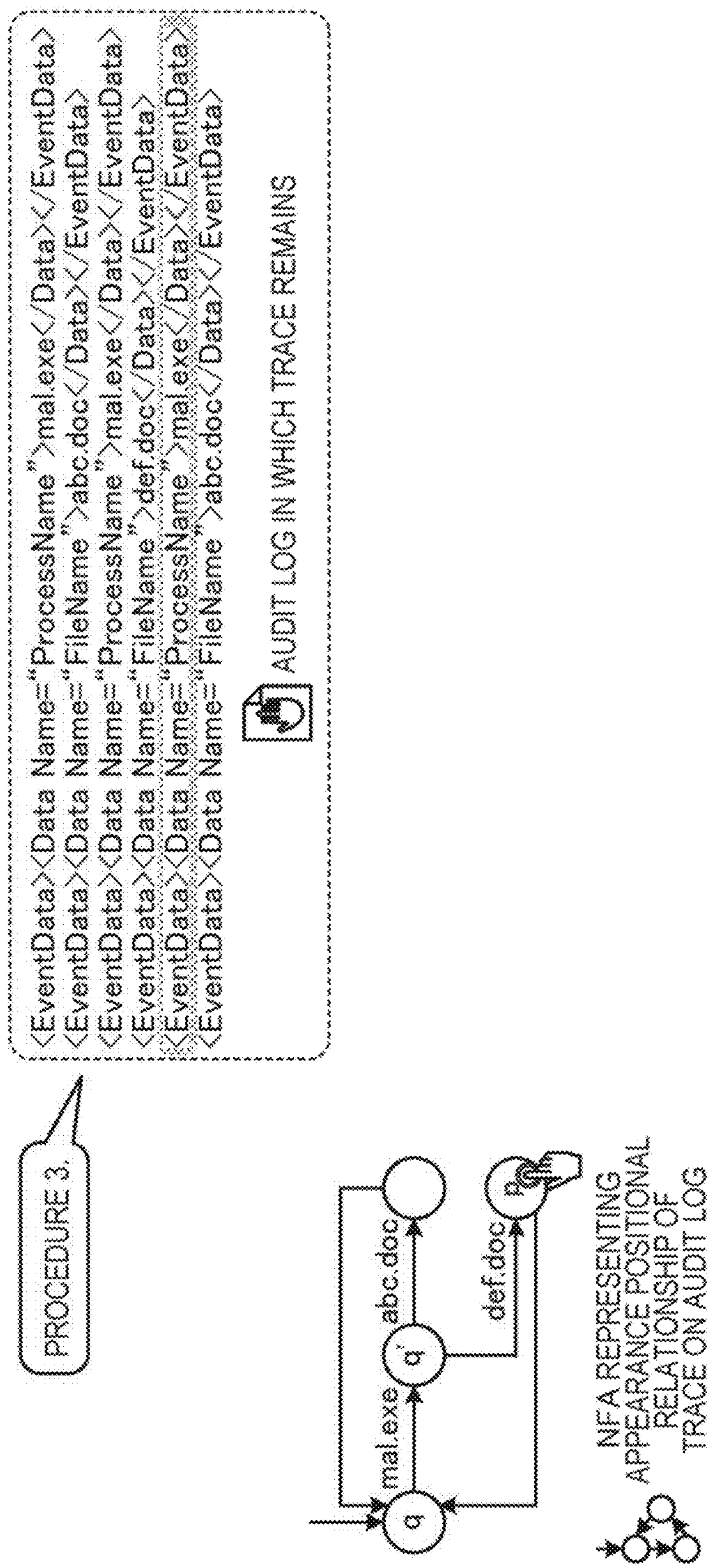
FIG. 20 is a diagram illustrating the details of processing by the NFA construction unit.
Figure 21:
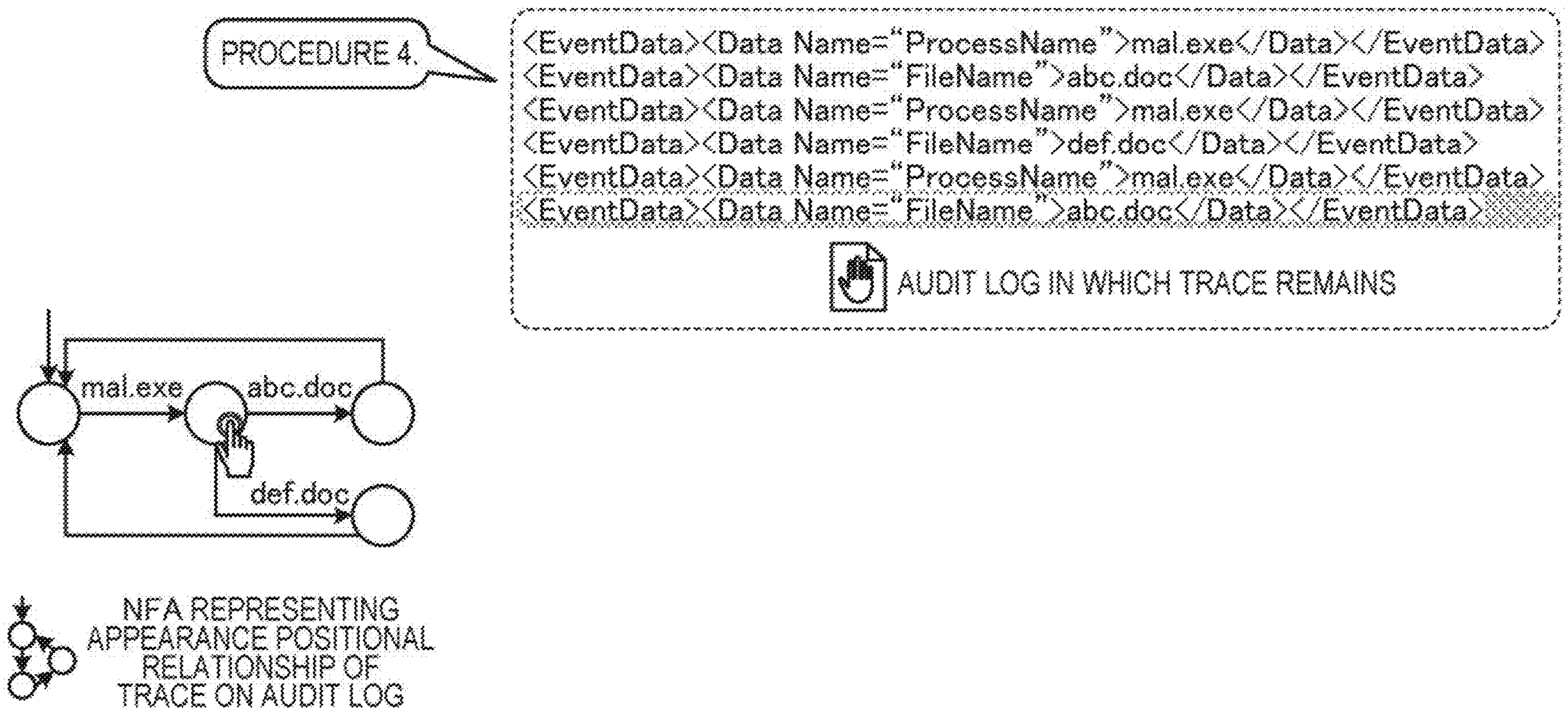
FIG. 21 is a diagram illustrating the details of processing by the NFA construction unit.
Figure 22:
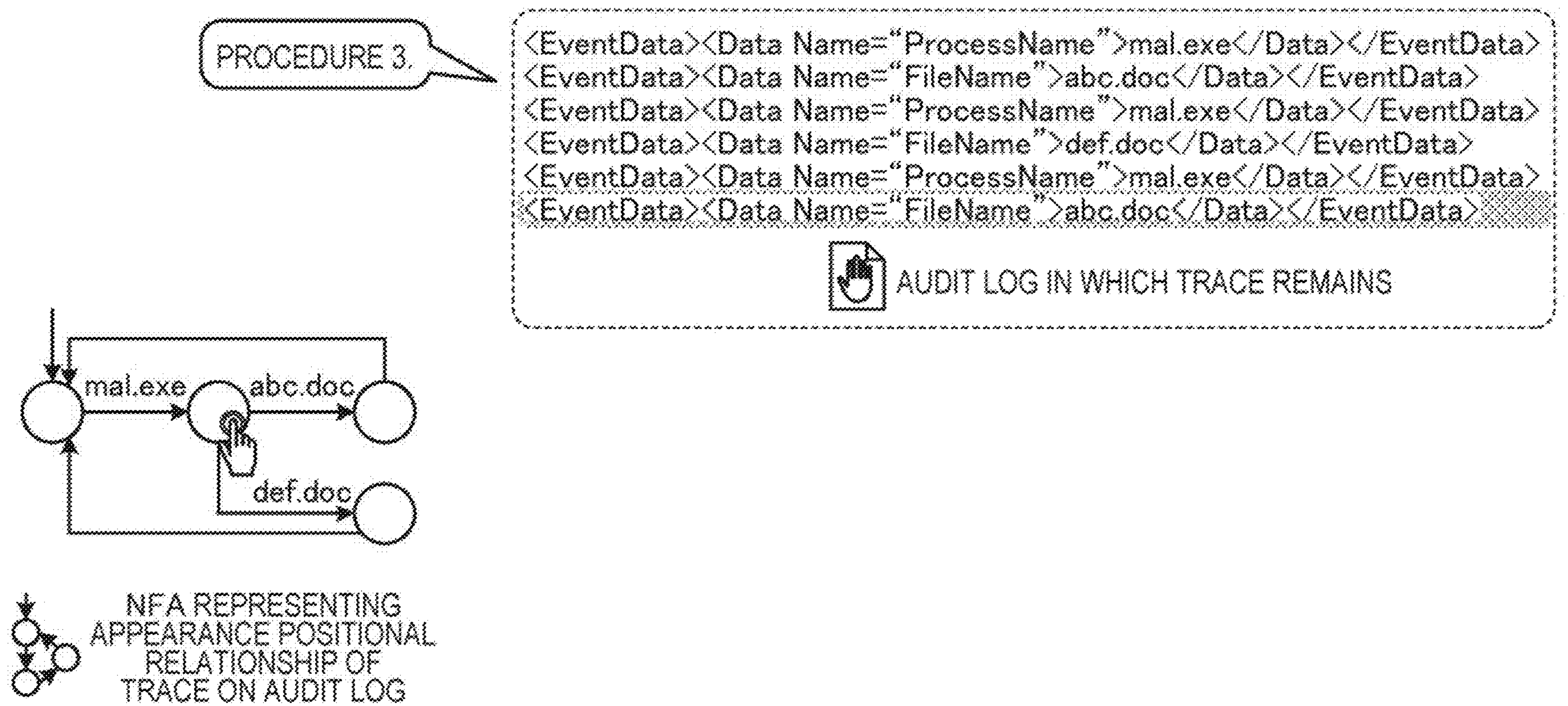
FIG. 22 is a diagram illustrating the details of processing by the NFA construction unit.
Figure 23:
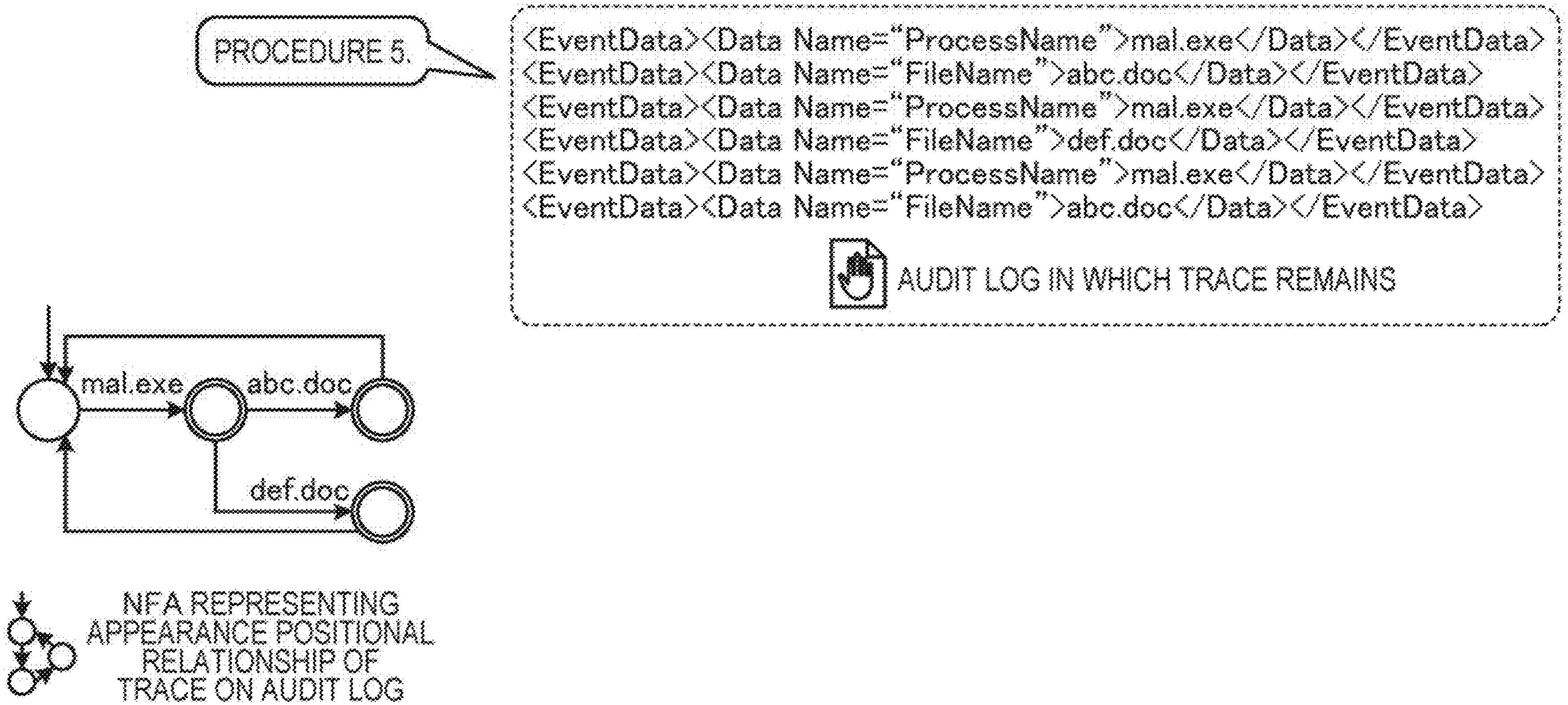
FIG. 23 is a diagram illustrating the details of processing by the NFA construction unit.

Then, as illustrated in FIG. 17, the NFA construction unit 12 selects an audit log in which the following trace remains (Procedure 4). Then, as illustrated in FIGS. 18 to 22, the NFA construction unit 12 repeats Procedure 3 and Procedure 4 until all traced audit logs are selected. Then, as illustrated in FIG. 23, when the NFA construction unit 12 selects the audit log in which all traces remain and repeats Procedure 3 and Procedure 4, the NFA construction processing is completed (Procedure 5).

The signature generation unit 13 generates a signature indicating a trace of an attack based on the graph structure data constructed by the NFA construction unit 12. For example, the signature generation unit 13 generates a signature by converting the NFA constructed by the NFA construction unit 12 by an algorithm for converting the NFA into a regular expression.

Figure 24:
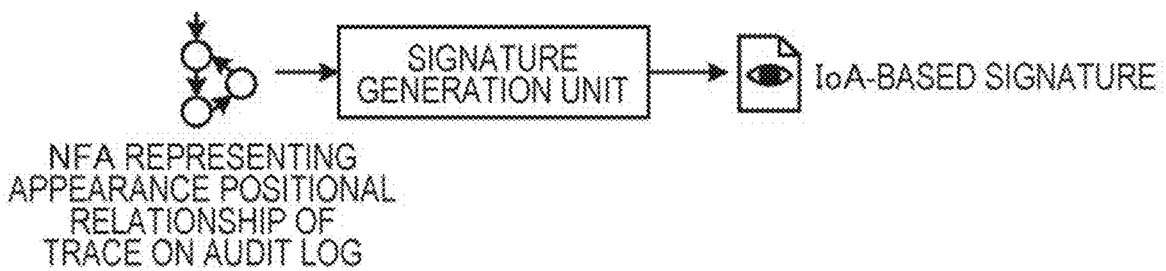
FIG. 24 is a diagram illustrating an outline of processing by a signature generation unit.

For example, as illustrated in FIG. 24, the signature generation unit 13 generates a signature from an NFA indicating an appearance positional relationship of a trace on the audit log. For example, the signature generation unit 13 converts the NFA passed from the NFA construction unit 12 into an IoA-based signature while applying an algorithm for converting a known NFA into a regular expression. Note that there are various algorithms for converting the NFA into a regular expression, and for example, there is a state elimination method, and any algorithm may be applied.

Figure 25:
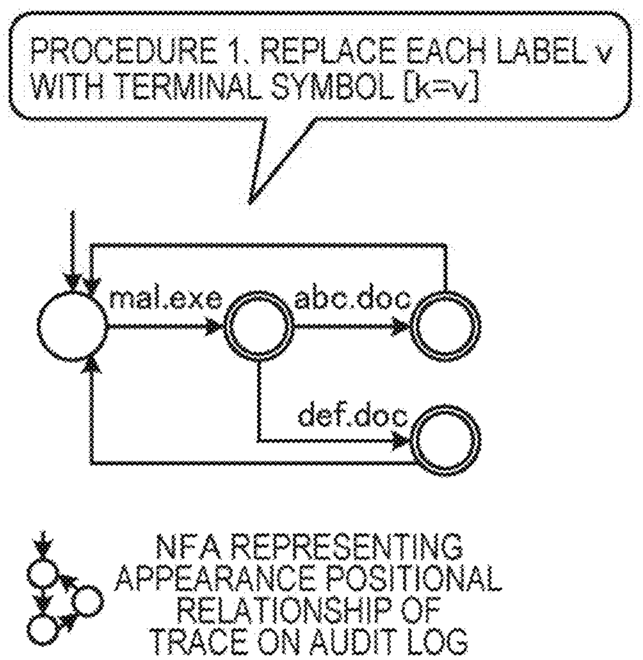
FIG. 25 is a diagram illustrating details of processing by the signature generation unit.
Figure 26:
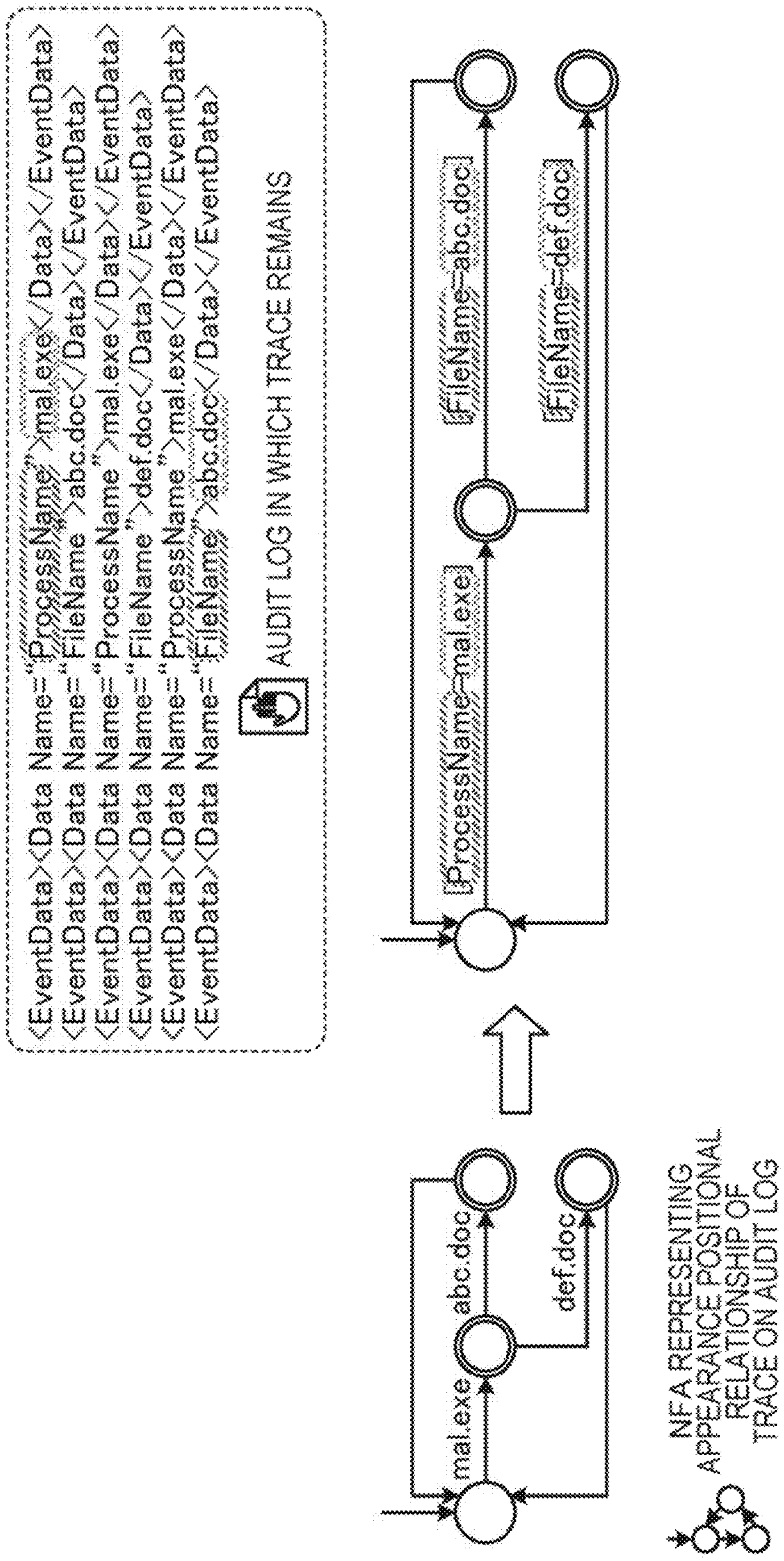
FIG. 26 is a diagram illustrating the details of processing by the signature generation unit.

Next, details of processing by the signature generation unit 13 will be described with reference to FIGS. 25 to 29. FIGS. 25 to 29 are diagrams illustrating the details of processing by the signature generation unit. As illustrated in FIGS. 25 and 26, the signature generation unit 13 replaces each label of the NFA with a terminal symbol (Procedure 1).

Figure 27:
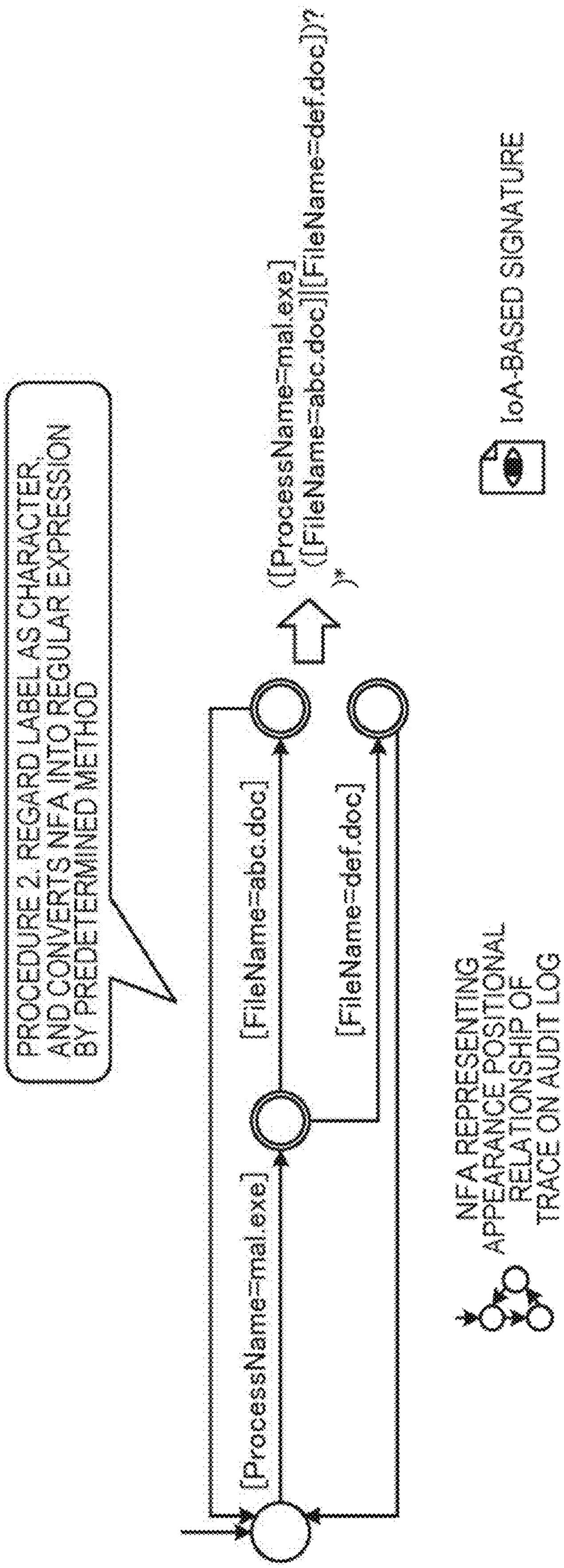
FIG. 27 is a diagram illustrating the details of processing by the signature generation unit.
Figure 28:
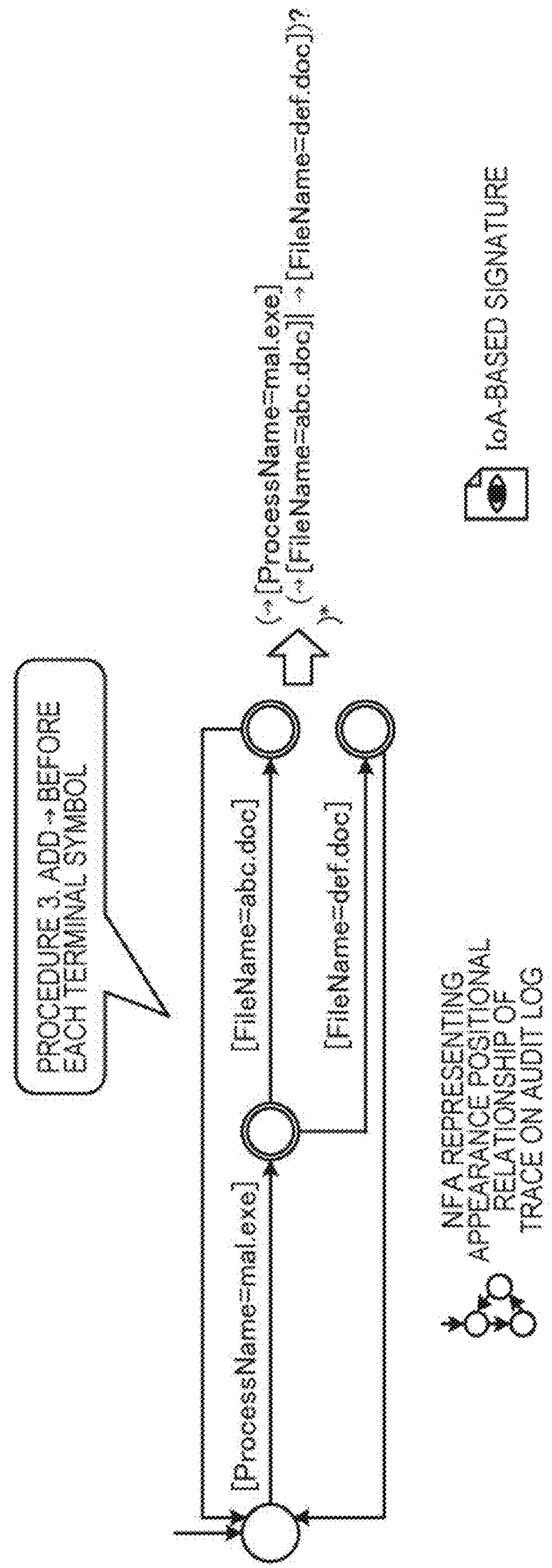
FIG. 28 is a diagram illustrating the details of processing by the signature generation unit.
Figure 29:
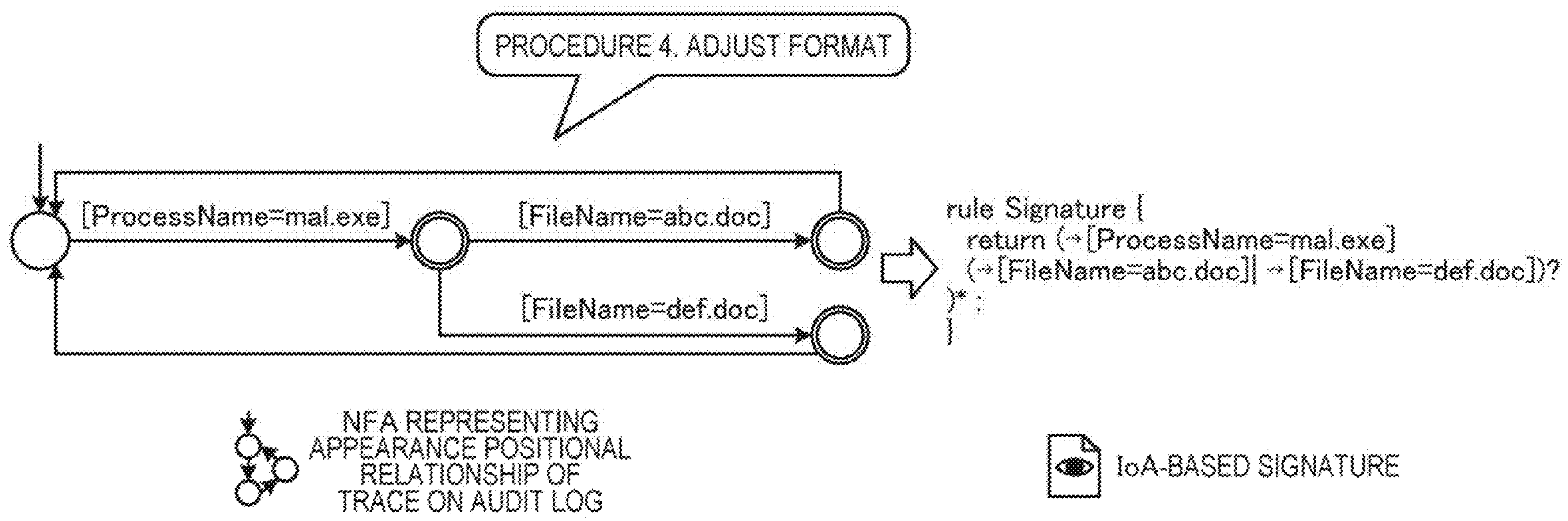
FIG. 29 is a diagram illustrating the details of processing by the signature generation unit.

Then, as illustrated in FIG. 27, the signature generation unit 13 regards the label as a character, and converts the NFA into a regular expression by a predetermined method (Procedure 2). Subsequently, as illustrated in FIGS. 28 and 29, the signature generation unit 13 adds a predetermined rightward wavy line arrow (see FIG. 28) before each terminal symbol of the IoA-based signature (Procedure 3) and adjusts the format (Procedure 4). By such a procedure, the signature generation unit 13 generates a signature.

The signature generation unit 13 outputs the generated signature. Thus, the generated signature is used to automatically detect an attack. Note that the attack detection processing may be performed by the generation device 10 or may be performed by an external device. Furthermore, there are many languages that describe the IoA-based signature, and examples thereof include temporal behavior query language (TBQL), τ-calculus, attack investigation query language (AIQL), streambased anomaly query language (SAQL), and ELL. Hereinafter, a case where the ELL is used as an example will be described. However, the IoA-based signature targeted by the present embodiment is not limited to the ELL, and may be any signature that can express anteroposterior relationship, repetition, and ambiguity between traces. The ELL is a language that defines attack behavior as a signature on an IoA basis for an audit log.

Here, the signature of the ELL will be described. FIG. 30 is a diagram illustrating notation of an ELL signature.

"Signature" in FIG. 30 is a name of a signature and is an arbitrary character string that is not empty.

"e" in FIG. 30 is a pattern representing the IoA, and the basic pattern is as follows.

- A termination symbol [K=v, . . . ] describes information of an IoC level, k represents a key (for example, ProcessId, FileName, IPAddress), and v represents a value (for example, 0×123, mal.doc, 192.0.2.1).
- The repetition e* means 0 or more repetitions of the expression matching e.
- Select e|e means match either first or next e
- Option e? means that the expression matching e appears 0 or 1 times.
- Skipping e→(rightward wavy line arrow) e skips unnecessary audit logs from the first e to the next e Here, an example of checking whether there is a trace of the IoA level in the audit log using ELL will be described. FIG. 31 is a diagram illustrating an example of the ELL signature. FIG. 32 is a diagram illustrating an example of an audit log. A confirmation example of whether there is a trace of the IoA level in the audit log using ELL will be described using the ELL signature illustrated in FIG. 31 and the audit log illustrated in FIG. 32 as examples. FIGS. 33 to 49 are diagrams illustrating the confirmation example as to whether there is the trace of the IoA level in the audit log using the ELL. Hereinafter, the rightward wavy line arrow is simply referred to as "→".

As illustrated in FIG. 33, in the ELL signature, the name of the signature is MalSig, and as a trace of the IoA level, it can be read that after a pattern in which an audit log in which FileName includes mal.doc comes after an audit log in which ProcessId includes 0×123 is repeated 0 times or more, an audit log in which IPAddress includes 192.0.2.4 may or may not appear.

Furthermore, as illustrated in FIG. 34, the audit log is information in which a simplified Windows Event Log is defined in XML, there are several EventData tags in the Event tag, and the EventData tag is recorded by one action. Hereinafter, the information surrounded by the EventData tag is referred to as a log. For example, <EventData> <Data Name="ProcessId"> 0×acc </Data> </EventData> is a log that records that 0×acc has appeared as a process ID.

As illustrated in FIG. 35, first, →[ProcessId=0×123] is evaluated. This means that the log is skipped up to the log in which the information that ProcessId is 0×123 is recorded. Then, as illustrated in FIG. 36, since the ProcessId of the first log is not 0×123, the first log is skipped.

Then, since the next line is a log with ProcessId of 0×123, the corresponding log can be found as illustrated in FIG. 37, and thus, the log is moved to the next log. Next, as illustrated in FIG. 38, →[FileName=mal.doc] is evaluated. This means skipping the log until recording the information that FileName is mal.doc. Then, as illustrated in FIG. 39, since the log being viewed is a log in which mal.doc is already recorded, the log is moved to the next log without skipping.

Then, as illustrated in FIG. 40, next, (→[ProcessId=0×123]→[FileName=mal.doc])* is evaluated. Since the pattern surrounded by * is matched with the log being viewed first, the pattern surrounded by * is checked again here.

As illustrated in FIG. 41, in order to evaluate→[ProcessId=0×123] again, the processing is performed in the same manner as at the beginning. Since the log being viewed is already recording 0×123, there is no skip and the log is moved to the next log. Then, as illustrated in FIG. 42, in order to evaluate→[FileName=mal.doc] again, the same processing as the first processing is performed. Since the log being viewed is already recording mal.doc, there is no skip and the log is moved to the next log.

Subsequently, as illustrated in FIG. 43, (→[ProcessId=0×123]→[FileName=mal.doc])* is evaluated. Here, the pattern already surrounded by * does not match after the log being viewed, and thus is not repeatedly performed.

Next, as illustrated in FIG. 44, →[IPAddress=192.0.2.4]? is evaluated. Although IPAddress is recorded in the log being viewed, the value of the log is different from 192.0.2.7 and does not match [IPAddress=192.0.2.4]. However, since [IPAddress=192.0.2.4] is surrounded by?, it does not need to match [IPAddress=192.0.2.4].

Then, as illustrated in FIG. 45, evaluation of the ELL signature is completed. Since matching has not failed, it can be seen that an action defined by the signature exists in the audit log. Next, as illustrated in FIG. 46, a case where there is no action defined by the ELL signature in the audit log will be described. In this ELL signature, there is log recording information in which ProcessId is 0×111 somewhere in the audit log, or there is log recording information in which FileName is failure.pptx.

Figure 48:
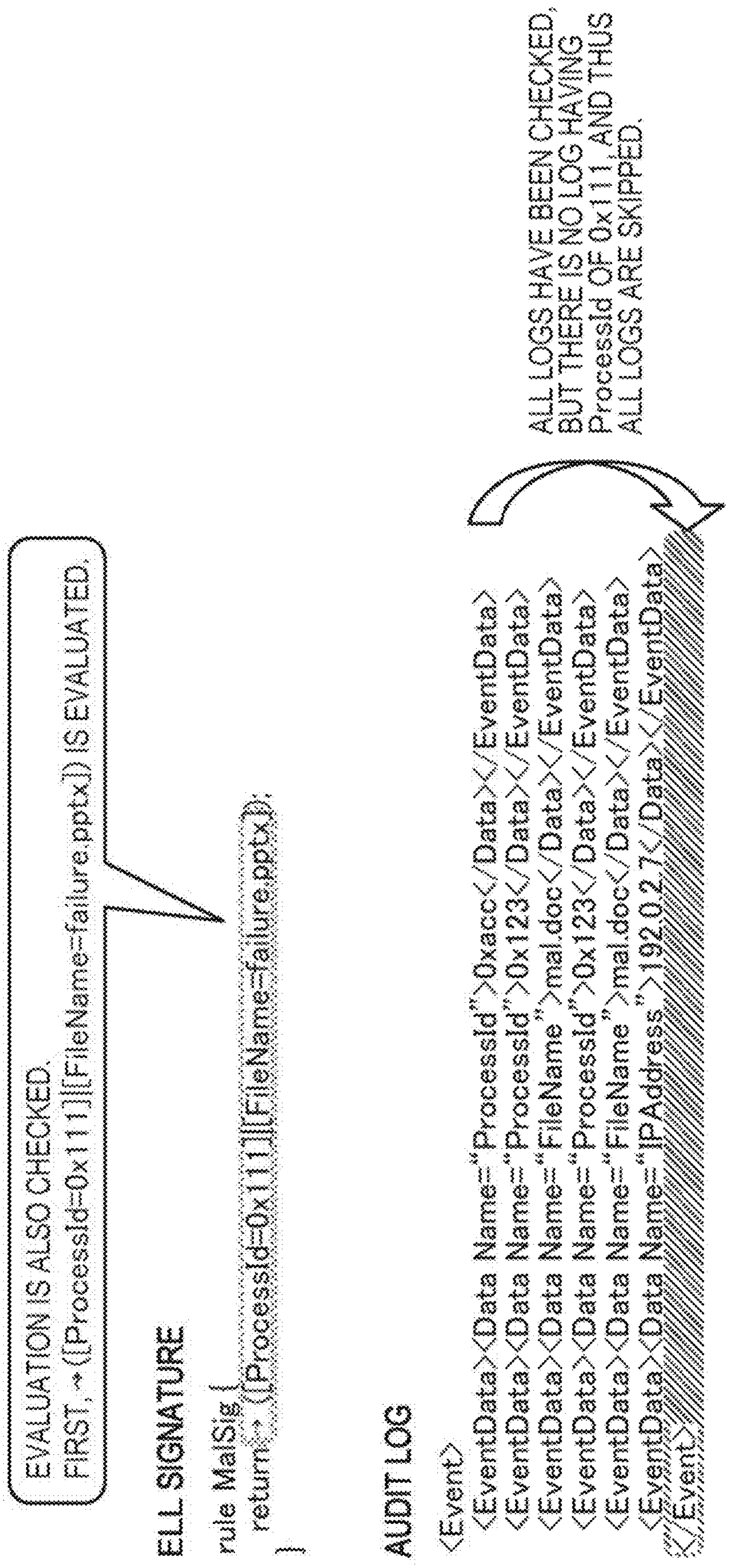
FIG. 48 is a diagram illustrating the confirmation example as to whether there is the trace of the IoA level in the audit log using the ELL.

As illustrated in FIG. 47, first, (→[ProcessId=0×111]|[FileName=failure.pptx]) is evaluated. As a result, as illustrated in FIG. 48, all the logs have been checked, but there is no log having ProcessId of 0×111, and thus all the logs are skipped. As illustrated in FIG. 49, since this match fails, this match of the ELL signature itself also fails. Therefore, it can be seen that there is no behavior defined by this ELL signature in this audit log.

[Processing Procedure by Generation Device]

Figure 50:
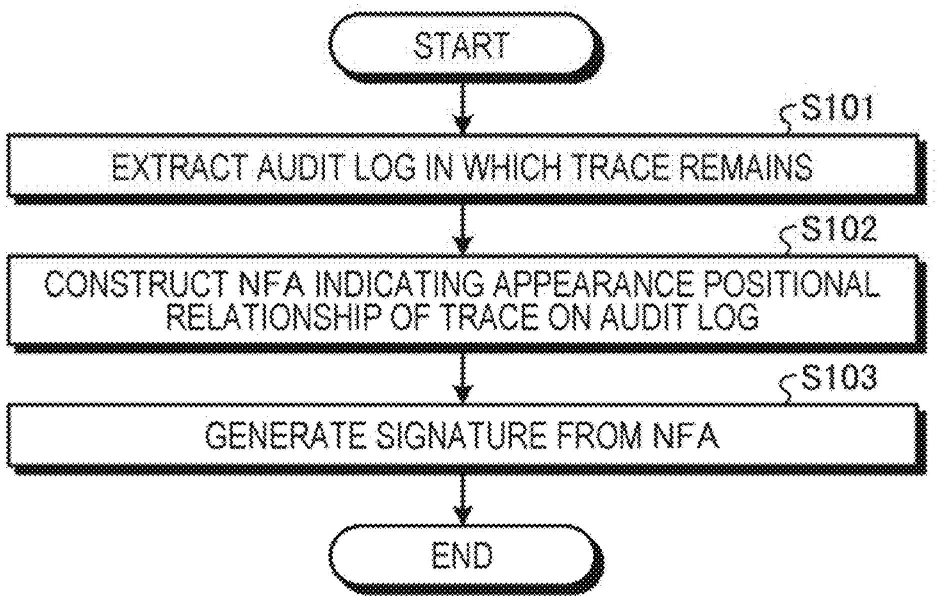
FIG. 50 is a flowchart illustrating an example of a processing procedure by the generation device.

Next, an example of a processing procedure of processing executed by the generation device 10 will be described with reference to FIG. 50. FIG. 50 is a flowchart illustrating an example of a processing procedure by the generation device.

As illustrated in FIG. 50, the audit log extraction unit 11 of the generation device 10 extracts an audit log in which a trace remains (Step S101). Then, the NFA construction unit 12 constructs an NFA indicating an appearance positional relationship of a trace on the audit log (Step S102). Thereafter, the signature generation unit 13 generates a signature of NFAk et al. (Step S103).

Effects of Embodiment

As described above, the generation device 10 of the present embodiment according to the embodiments extracts log information in which a trace of intrusion remains from the log information, constructs graph structure data indicating an attack behavior order using time-series information included in the extracted log information, and generates a signature indicating the trace of the attack based on the constructed graph structure data. Therefore, the generation device 10 can automatically generate the IoA-based signature from the IoC.

That is, the generation device 10 automatically generates the IoA-based signature from the IoC. Therefore, for example, since a worker, an operator, or the like can automatically generate a signature from the discovered IoC of the own system, an unknown (not recognized as a threat) attack can also be detected.

In addition, with the generation device 10, the user can obtain the IoA-based signature for capturing the trace and the behavior of the attack indicated by the audit log without memorizing specialized knowledge or the syntax of the IoA-based signature description language by simply collecting traces of attacks at the IoC level and audit logs.

[System Configuration and the Like]

Each component of each device illustrated according to the above embodiments is functionally conceptual and does not necessarily have to be physically configured as illustrated. That is, a specific form of distribution and integration of each device is not limited to the illustrated form, and all or a part thereof can be functionally or physically distributed and integrated in any unit according to various loads, usage conditions, and the like. Furthermore, all or any part of each processing function performed in each device can be realized by a CPU and a program analyzed and executed by the CPU, or can be realized as hardware by wired logic.

Furthermore, among the processing described in the above embodiments, all or a part of the processing described as being automatically performed can be manually performed, or all or a part of the processing described as being manually performed can be automatically performed by a known method. In addition, the processing procedures, the control procedures, the specific names, and the information including various kinds of data and parameters described in the above specification and drawings can be arbitrarily changed, unless otherwise specified.

[Program]

In addition, it is also possible to create a program in which the processing to be executed by the generation device 10 described in the embodiment described above is described in a language that can be executed by a computer. In this case, the computer executes the program, and thus the effects similar to those of the above embodiments can be obtained. Further, the program may be recorded in a computer-readable recording medium, and the program recorded in the recording medium may be read and executed by the computer to implement processing similar to the embodiment described above.

Figure 51:
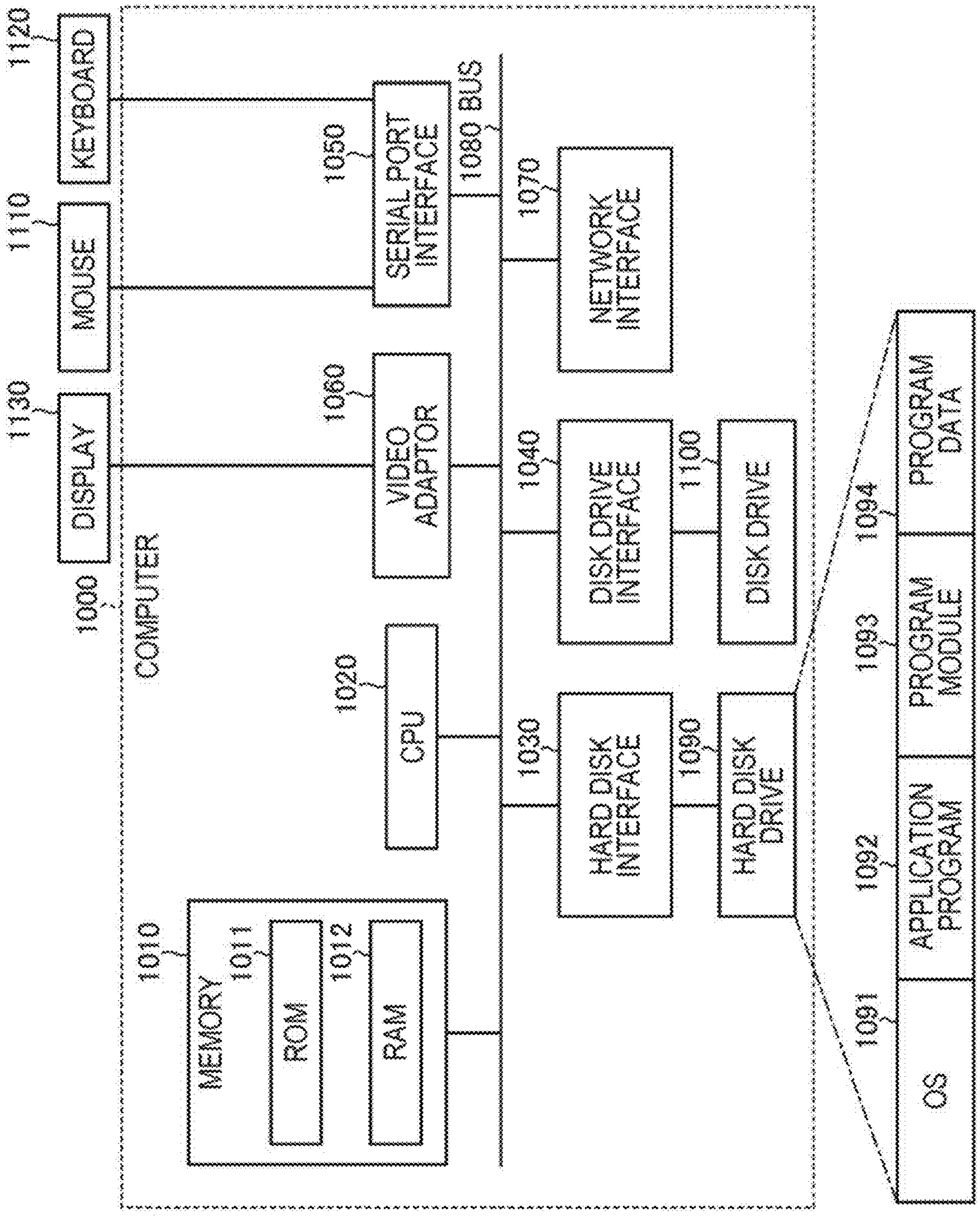
FIG. 51 is a diagram illustrating a computer that executes a program.

FIG. 51 is a diagram illustrating a computer that executes a program. As illustrated in FIG. 51, a computer 1000 includes, for example, a memory 1010, a CPU 1020, a hard disk drive interface 1030, a disk drive interface 1040, a serial port interface 1050, a video adapter 1060, and a network interface 1070, and these units are connected by a bus 1080.

As illustrated in FIG. 51, the memory 1010 includes a read only memory (ROM) 1011 and a RAM 1012. The ROM 1011 stores, for example, a boot program such as a basic input output system (BIOS). The hard disk drive interface 1030 is connected to a hard disk drive 1090 as illustrated in FIG. 51. The disk drive interface 1040 is connected to a disk drive 1100 as illustrated in FIG. 51. For example, a removable storage medium such as a magnetic disk or an optical disk is inserted into the disk drive 1100. As illustrated in FIG. 51, the serial port interface 1050 is connected to, for example, a mouse 1110 and a keyboard 1120. As illustrated in FIG. 51, the video adapter 1060 is connected to, for example, a display 1130.

Here, as illustrated in FIG. 51, the hard disk drive 1090 stores, for example, an OS 1091, an application program 1092, a program module 1093, and program data 1094. That is, the above program is stored as a program module in which a command executed by the computer 1000 is described, for example, in the hard disk drive 1090.

Further, the various data described in the embodiment described above are stored as program data in, for example, the memory 1010 and the hard disk drive 1090. Then, the CPU 1020 reads out the program module 1093 and the program data 1094 stored in the memory 1010 and the hard disk drive 1090 to the RAM 1012 as necessary, and executes various processing procedures.

Note that the program module 1093 and the program data 1094 related to the program are not limited to being stored in the hard disk drive 1090, and may be stored in, for example, a storage medium that is detachably attachable, and read by the CPU 1020 via a disk drive or the like. Alternatively, the program module 1093 and the program data 1094 related to the program may be stored in another computer connected via a network (such as local area network (LAN) or a wide area network (WAN)) and read by the CPU 1020 via the network interface 1070.

Although the embodiment to which the invention made by the present inventor is applied has been described above, the present invention is not limited by the description and drawings for explaining a part of the disclosure of the present invention according to the embodiment. That is, other embodiments, examples, operation techniques, and the like made by those skilled in the art based on the present embodiments are all included in the scope of the present invention.

REFERENCE SIGNS LIST

10 Generation device
11 Audit log extraction unit
12 NFA construction unit
13 Signature generation unit

The invention claimed is:

1. A generation device comprising:
processing circuitry configured to:
extract event data in which a trace of intrusion remains from log information;
construct, using time-series information included in the event data, graph structure data indicating an attack behavior order that is an order of events of an attack included in the event data; and
generate a signature indicating a trace of the attack based on the constructed graph structure data indicating the attack behavior order.

2. The generation device according to claim 1, wherein the processing circuitry is further configured to:
search for a character string corresponding to the trace of the intrusion in the event data, and
extract the event data including the character string corresponding to the trace of the intrusion.

3. The generation device according to claim 1, wherein the processing circuitry is further configured to construct a nondeterministic finite automaton (NFA) as the graph structure data.

4. The generation device according to claim 3, wherein the processing circuitry is further configured to generate the signature by converting the constructed NFA by an algorithm for converting the NFA into a regular expression.

5. A generation method executed by a generation device, the generation method comprising:
extracting event data in which a trace of intrusion remains from log information;
constructing, using time-series information included in the event data, graph structure data indicating an attack behavior order that is an order of events of an attack included in the event data; and
generating a signature indicating a trace of the attack based on the constructed graph structure data indicating the attack behavior order.

6. A non-transitory computer-readable recording medium storing therein a generation program for causing a computer to execute:
extracting event data in which a trace of intrusion remains from log information;

constructing, using time-series information included in the event data, graph structure data indicating an attack behavior order that is an order of events of an attack included in the event data; and generating a signature indicating a trace of the attack based on the constructed graph structure data indicating the attack behavior order.

7. The generation device according to claim 1, wherein the processing circuitry is configured to add a vertex corresponding to the trace of intrusion to the graph structure data.

8. The generation device according to claim 7, wherein the processing circuitry is configured to add the vertex corresponding to the trace of intrusion to the graph structure data if there is no vertex corresponding to the trace in the graph structure data.

9. The generation device according to claim 1, wherein the processing circuitry is configured to add an epsilon transition to a vertex corresponding to the trace of intrusion.

10. The generation device according to claim 9, wherein the processing circuitry is configured to add the epsilon transition to the vertex corresponding to the trace if the vertex corresponding to the trace of intrusion already exists in the graph structure data.

11. The generation device according to claim 1, wherein the processing circuitry is configured to generate the signature by replacing a label of the constructed graph structure data with a terminal symbol.

12. The generation device according to claim 11, wherein the processing circuitry is configured to add a predetermined arrow symbol before the terminal symbol of the signature.

13. The generation device according to claim 1, wherein the signature is described in an Event Log Language (ELL).

14. The generation device according to claim 1, wherein the processing circuitry is configured to collate the log information and an Indicator of Compromise (IoC).

15. The generation device according to claim 4, wherein the processing circuitry is configured to apply a state elimination method to convert the NFA into the regular expression.

16. The generation device according to claim 1, wherein the event data extracted from the log information includes a process name and a file name.

17. The generation device according to claim 1, wherein the constructed graph structure data represents an appearance positional relationship of the trace of intrusion.

* * * * *